United States Patent
Green

(10) Patent No.: US 11,150,696 B2
(45) Date of Patent: Oct. 19, 2021

(54) ENHANCED APPLICATION PREVIEW MODE

(71) Applicant: Apple Inc., Cupertino, CA (US)

(72) Inventor: Austen J. Green, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/724,881

(22) Filed: Dec. 23, 2019

(65) Prior Publication Data

US 2020/0125135 A1 Apr. 23, 2020

Related U.S. Application Data

(63) Continuation of application No. 15/179,824, filed on Jun. 10, 2016, now Pat. No. 10,520,979.

(51) Int. Cl.
| | | |
|---|---|---|
| *G06F 1/16* | (2006.01) | |
| *G06F 3/0488* | (2013.01) | |
| *G06F 3/0482* | (2013.01) | |
| *G06T 13/80* | (2011.01) | |

(52) U.S. Cl.
CPC ............ *G06F 1/163* (2013.01); *G06F 3/0482* (2013.01); *G06F 3/04883* (2013.01); *G06T 13/80* (2013.01)

(58) Field of Classification Search
CPC .... G06F 3/04883; G06F 3/0482; G06F 1/163; G06T 13/80
See application file for complete search history.

(56) References Cited

U.S. PATENT DOCUMENTS

| | | | |
|---|---|---|---|
| 8,933,952 B2 | 1/2015 | Zaman et al. | |
| 9,060,196 B2 | 6/2015 | Torr et al. | |
| 9,367,211 B1 | 6/2016 | Turner | |
| 9,916,075 B2 | 3/2018 | Chen et al. | |
| 9,918,664 B2 | 3/2018 | Blahnik et al. | |
| 9,974,467 B2 | 5/2018 | Blahnik et al. | |

(Continued)

FOREIGN PATENT DOCUMENTS

| | | |
|---|---|---|
| CN | 102171940 | 8/2011 |
| CN | 102622270 | 8/2012 |

(Continued)

OTHER PUBLICATIONS

Budiu, "Smartwatches Are the Future—But Samsung Galaxy Gear Only Partway There", published: Dec. 8, 2013, nngroup.com, https://www.nngroup.com/articles/samsung-watch/ (Year: 2013).*

(Continued)

*Primary Examiner* — Seth A Silverman
(74) *Attorney, Agent, or Firm* — Kilpatrick Townsend & Stockton LLP

(57) ABSTRACT

Techniques for enhancing the viewing of applications in a preview provider are provided. A method includes receiving an indication to provide a preview mode on a display of the computing device, providing screenshots of a plurality of applications in the preview mode such that the screenshots are accessible for viewing by a user. The method also includes identifying the first application to provide the first screenshot in an updated mode and changing a state of the first application from a suspended state to an inactive state by allocating processing time of the one or more processors to the first application, and displaying updates of the first screenshot while the first application is in the inactive state.

21 Claims, 12 Drawing Sheets

(56) References Cited

U.S. PATENT DOCUMENTS

| | | | |
|---|---|---|---|
| 2006/0123353 A1* | 6/2006 | Matthews | G06F 3/0482 715/779 |
| 2008/0005736 A1 | 1/2008 | Apacible et al. | |
| 2009/0106674 A1* | 4/2009 | Bray | G06F 16/156 715/762 |
| 2010/0088598 A1 | 4/2010 | Lee et al. | |
| 2011/0138295 A1 | 6/2011 | Momchilov et al. | |
| 2011/0306304 A1 | 12/2011 | Forutanpour et al. | |
| 2011/0317195 A1 | 12/2011 | Mitsui et al. | |
| 2012/0210266 A1 | 8/2012 | Jiang et al. | |
| 2012/0290657 A1 | 11/2012 | Parks et al. | |
| 2012/0297304 A1 | 11/2012 | Maxwell | |
| 2012/0324481 A1 | 12/2012 | Xia et al. | |
| 2013/0024812 A1* | 1/2013 | Reeves | G09G 5/14 715/810 |
| 2013/0190032 A1 | 7/2013 | Li | |
| 2014/0013271 A1 | 1/2014 | Moore et al. | |
| 2014/0189334 A1 | 7/2014 | Cheng et al. | |
| 2014/0245461 A1 | 8/2014 | O'Neill et al. | |
| 2014/0258238 A1 | 9/2014 | Jin et al. | |
| 2014/0280580 A1 | 9/2014 | Langlois et al. | |
| 2014/0372356 A1 | 12/2014 | Bilal et al. | |
| 2014/0378159 A1 | 12/2014 | Dolbakian et al. | |
| 2015/0128042 A1 | 5/2015 | Churchill et al. | |
| 2015/0134602 A1 | 5/2015 | Nicholas et al. | |
| 2015/0293664 A1 | 10/2015 | Burchell et al. | |
| 2015/0324137 A1 | 11/2015 | Wu et al. | |
| 2015/0347204 A1 | 12/2015 | Stanley-Marbell et al. | |
| 2016/0054862 A1 | 2/2016 | Reeves et al. | |
| 2016/0092275 A1 | 3/2016 | Booman et al. | |
| 2017/0126610 A1 | 5/2017 | Sachidanandam et al. | |
| 2017/0285894 A1 | 10/2017 | Barrus et al. | |
| 2017/0357413 A1 | 12/2017 | Green | |
| 2017/0357465 A1 | 12/2017 | Dzeryn et al. | |
| 2017/0357495 A1 | 12/2017 | Crane et al. | |

FOREIGN PATENT DOCUMENTS

| | | |
|---|---|---|
| CN | 102681896 | 9/2012 |
| CN | 102934467 | 2/2013 |
| CN | 102984383 | 3/2013 |
| CN | 103200306 | 7/2013 |
| CN | 104303151 | 1/2015 |
| EP | 2332266 | 6/2011 |
| KR | 20100021725 | 2/2010 |
| KR | 20120093113 | 8/2012 |
| KR | 101591601 | 2/2016 |
| TW | 201232400 | 8/2012 |
| WO | 2010038985 | 4/2010 |
| WO | 2017213878 | 12/2017 |

OTHER PUBLICATIONS

U.S. Appl. No. 15/179,824 , "Final Office Action", dated Sep. 28, 2018, 43 pages.
U.S. Appl. No. 15/179,824 , "Non Final Office Action", dated Apr. 11, 2018, 32 pages.
U.S. Appl. No. 15/179,824 , "Non-Final Office Action", dated Apr. 8, 2019, 43 pages.
U.S. Appl. No. 15/179,824 , "Notice of Allowance", dated Aug. 26, 2019, 8 pages.
Bertoncin , "When does Android take its recent apps switcher sceenshot", Available Online at:-https://stackoverflow.com/questions/31011593/whendoesandroidtakeitsrecentappsswitcherscreenshot, Jun. 23, 2015, 2 pages.
Budiu , "Smartwatches Are the Future-But Samsung Galaxy Gear Only Partway There", nngroup.com, Available at URL https://www.nngroup.com/articles/samsung-watch, Dec. 8, 2013, 15 pages.
Cozma , "How recent aps work on Android 5.0 Lollipop", Available Online at: https://www.cnet.com/how-to/how-recent-apps-work-on-android-5-0-lollipop, Nov. 4, 2014, 4 pages.
Dobie , "Android N's Recent Apps Key Has Grown a Bunch of Awesome New Features", androidcentral.com, Available at URL https://www.androidcentral.com/android-n-recents-menu-makes-super-easy-hop-between-apps, Mar. 9, 2016, 3 pages.
Hall , "Watch Complications: What is Apple Talking About?", Pocket-Lint.com, Available online at: https://www.pocket-lint.com/smartwatches/news/apple/135377-watch-complications-what-is-apple-talking-about, Sep. 22, 2015, 8 pages.
Leonhard , "Windows 7 Ail-In-One for Dummies", Wiley Publishing, Inc., 2009, 891 pages.
International Patent Application No. PCT/US2017/034506 , "International Search Report and Written Opinion", dated Aug. 24, 2017, 17 pages.
Qiu et al., "Towards Power-Efficient Smartphones by Energy-Aware Dynamic Task Scheduling", IEEE 14th International Conference on High Performance Computing and Communications, 2012, pp. 1466-1472.
Stinson , "Google Just Made its Smartwatch Faces Actually Useful", Wired.com, Available online at: https://www.wired.com/2015/08/google-just-made-smartwatch-faces-actually-useful/, Aug. 2015, 4 pages.
Whitwam , "Lollipop Feature Spotlight", Available Online at:-http://www.androidpolice.com/2014/10/17/lollipop-feature-spotlight-the-recent-apps-listnow-%20persists-through-reboot/ , Oct. 17, 2004, 8 pages.
Yan et al., "Fast App Launching for Mobile Devices Using Predictive User Context", Jun. 25-29, 2012, 14 pages.
Korean Patent Application No. 10-2018-7034647 , Notice of Decision to Grant, dated Sep. 9, 2020, 2 pages.
Chinese Patent Application No. 201780033176.9, Office Action dated Apr. 8, 2021, 16 pages.

* cited by examiner

ENHANCED APPLICATION PREVIEW MODE

CROSS REFERENCES TO RELATED APPLICATIONS

This application is a continuation of U.S. patent application Ser. No. 15/179,824, filed Jun. 10, 2016, which is hereby incorporated by reference in its entirety for all purposes, and which is related to commonly-owned U.S. application Ser. No. 15/179,863, filed Jun. 10, 2016, directed to "PROVIDING UPDATED APPLICATION DATA FOR PREVIEWING APPLICATIONS ON A DISPLAY," and commonly-owned U.S. application Ser. No. 15/179,877 filed Jun. 10, 2016, directed to "MEMORY MANAGEMENT FOR APPLICATION LOADING," which are incorporated by reference it their entirety for all purposes.

BACKGROUND

Many applications can be used on mobile devices, such as wearable devices (e.g., a smartwatch). At a given time, a user may have several applications that are open, but are not being currently used by the user. That is, one or more applications may not be in an active state or in the foreground. For example, a user may have one or more e-mail applications, a workout application, a messaging application, and a timer application (e.g., stopwatch) currently open on their mobile device. However, only one of the applications (e.g., workout application) is currently being used by the user and is in an active state and the other applications can be in a suspended state.

Currently in iOS, all open applications can be browsed by, for example, clicking the home button twice in order to view, for example, a multi-tasking folder or application switching folder. If a first application was currently executing in the foreground (active state), then that application will become inactive so that a user cannot interact with it. In the inactive state, the first application will have a screen that is updated as a user swipes back and forth (e.g. swipe right or swipe left) to view the applications that are currently open in the multi-tasking folder.

However, only the most recently used application will be up-to-date. Therefore, if a user was recently using an e-mail application, and a messaging application and a timer application were used an hour ago, a snapshot representing the e-mail application may be up-to-date, and a snapshot representing the messaging application and the timer application may not be up-to-date when the user views the applications in the preview mode. Specifically, the most recent messages may not appear in the messaging application or the current stopwatch time may not appear in the timer application while the user is viewing the application in the applications preview mode.

In addition, although one or more applications in the preview mode may be up-to-date, the updating of the applications may be a drain on the resources of the smartwatch (e.g., runtime memory, battery, etc.). Further, there may be a delay in providing updated information while in the preview mode.

Thus, improvements for displaying updated applications in an application preview mode is desired. Specifically, it would be beneficial if the applications in the preview mode are placed in a live state as soon as possible. In addition, it would be beneficial if the updated applications are managed so as to not to waste or drain resources of the mobile device (e.g., a smartwatch).

SUMMARY

In accordance with some embodiments, a certain set of applications can be designated for viewing in a preview mode on a browsable user interface of a computing device. While in the preview mode, the computing device can determine screenshots of the set of applications as snapshots that are reasonably up-to-date such that the snapshots may be displayed to a user, but the user cannot interact with the applications. An application of the set of applications can be designated to have its screenshots updated in a continuous mode based on a location the application's screenshot on the browsable user interface. In this manner, such a designated application can its screenshots up-to-date, e.g., to show a timer or score of a game, when the screenshot is being viewed by a user. To update the screenshots, processing time can be allocated to the application in the preview mode so that the application can execute and continuously update its screenshot, even though the application is not in a state that the user can interact with the application. The applications can be updated continuously or actively. Other applications in the preview mode may be in a suspended state and be represented by a snapshot that is not being updated (e.g., not up-to-date).

In accordance with some embodiments, an application can be allocated processing time according to a state of the application. For example, one or more applications can be assigned an inactive state, which does not allow user interaction, but which allows the application to execute and update its display as if it was active. The application would not be active as it is not executing in a fully interactive mode in the full display, but the allocation of processing time allows the application to update its screenshot continuously while the user is viewing the screenshot in the preview mode, ensuring up-to-date information when needed.

In some embodiments, only one application in the preview mode would be put into the inactive state at any time, with the rest of the applications being in a suspended state. Thus, a screenshot of the application in the inactive state can be updated while snapshots of applications in a suspended state can remain the same. The determination of which application is in the inactive state can be based on which application is in the central position on the screen, as well as other factors, such as which other applications are inactive, speed of scrolling through the applications in the preview mode, whether an application has received a notification, and information received by the application about its need to update information (live, semi-static, static, and the like). In accordance with some embodiments, more than one application could be in an inactive state, and therefore, the screenshots of more than one application can be updated.

Other embodiments are directed to systems, portable consumer devices, and computer readable media associated with the methods described herein.

A better understanding of the nature and advantages of exemplary embodiments may be gained with reference to the following detailed description and the accompanying drawings.

DESCRIPTION OF THE DRAWINGS

The disclosure will be readily understood by the following detailed description in conjunction with the accompanying drawings, wherein like reference numerals designate like elements, and in which.

DETAILED DESCRIPTION

Usually, only a most recently used application will be updated even if the application is not displayed on a screen of a mobile device. That is, a screenshot or snapshot representing the most recently used application will be updated. Thus, all of the other screenshots or snapshots of the other applications will be outdated.

This problem can occur in a dock on a smartwatch. A dock can also be known as a preview mode that shows snapshots of applications. A preview mode can include one or more applications that are designated by a user for viewing in the preview mode. The user can select the preview mode by, for example, swiping up on a user interface of the mobile device in order to access a browsable interface. A user can preview all of the applications currently open on their smartwatch via the preview mode. For example, if a user accesses their preview mode, the user may then be able to determine applications the user currently has open by swiping right or left through the open applications.

When a user selects a previously accessed application from a preview mode, that is, an application different from a most recently accessed application, the selected application is updated and displayed on the display. However, it would be beneficial if more than just the most recently used application was updated while in the preview mode. That is, it would be beneficial if a plurality of applications available in the preview mode were updated so that the snapshots of the applications in the preview mode are up-to-date, without requiring the user to select the particular application. Therefore, a user can see a status of multiple applications in the preview mode without having to access and/or select each of the applications separately (e.g., activate the application).

In addition, it would be beneficial if the applications in the preview mode remained up-to-date without draining the resources of the mobile phone.

I. Improving Application Viewing According to State

A. Overview of Method

Figure 1:
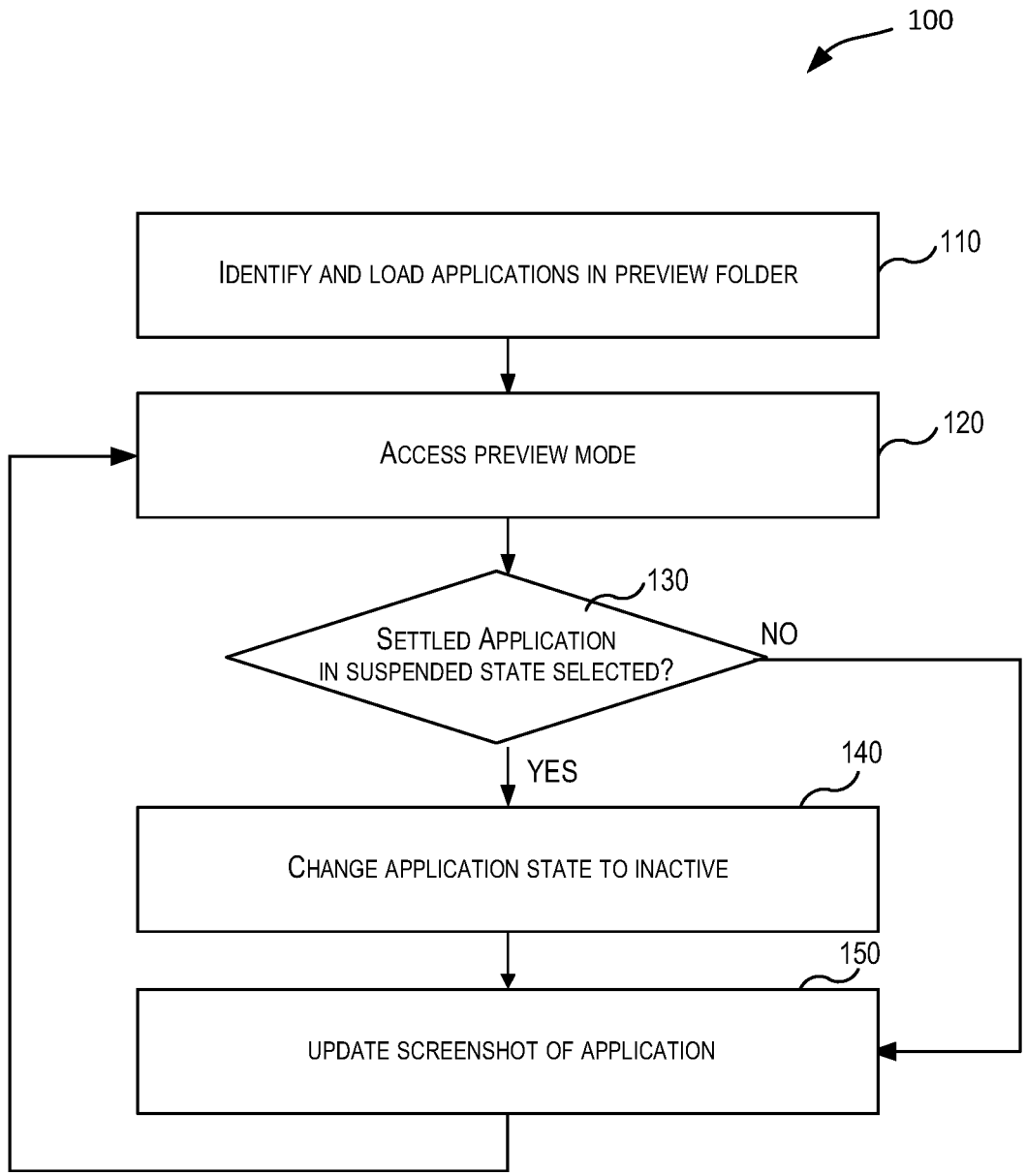
FIG. 1 illustrates a flowchart of a method for updating applications in a preview mode, in accordance with some embodiments.

FIG. 1 illustrates a flowchart of a method 100 for updating applications in a preview mode, in accordance with some embodiments. Method 100 can be performed by a computing device, e.g., with a touch-sensitive display. The computing device may have limited processing power and a limited display screen as the computing device may be a mobile device (e.g., a wearable device), thereby presenting challenges for obtaining information from applications on the computing device.

In block 110, applications that are to be displayed in a preview mode are identified and loaded into a memory (e.g., random access memory (RAM) of the computing device. Not all of the applications designated for a preview mode are necessarily loaded into memory, e.g., if the size of all of the application for preview mode are too large. Designating applications for preview mode can be performed in a variety of ways. For example, a user can select specific applications for including in the preview mode. In another example, applications that the user currently has open on the computing device can be identified in order to be displayed in the preview mode. A mixture of both ways can be used, e.g., with a certain number of slots of preview mode reserved for applications that are most recently used.

In block 120, a user may choose to view the applications in the preview mode. For example, the user may swipe up on a touch interface of the display of the computing device. In response to the user swiping up, the preview mode can be displayed by providing a browsable user interface for the user to browse snapshots of the applications. In one implementation, the application that a user has most recently accessed can initially be in an inactive state, whereas applications that are not the most recently accessed application can initially be in a suspended state. That is, applications that are designated for the preview mode or applications that are currently open can be viewed by a user in the preview mode.

Figure 2:
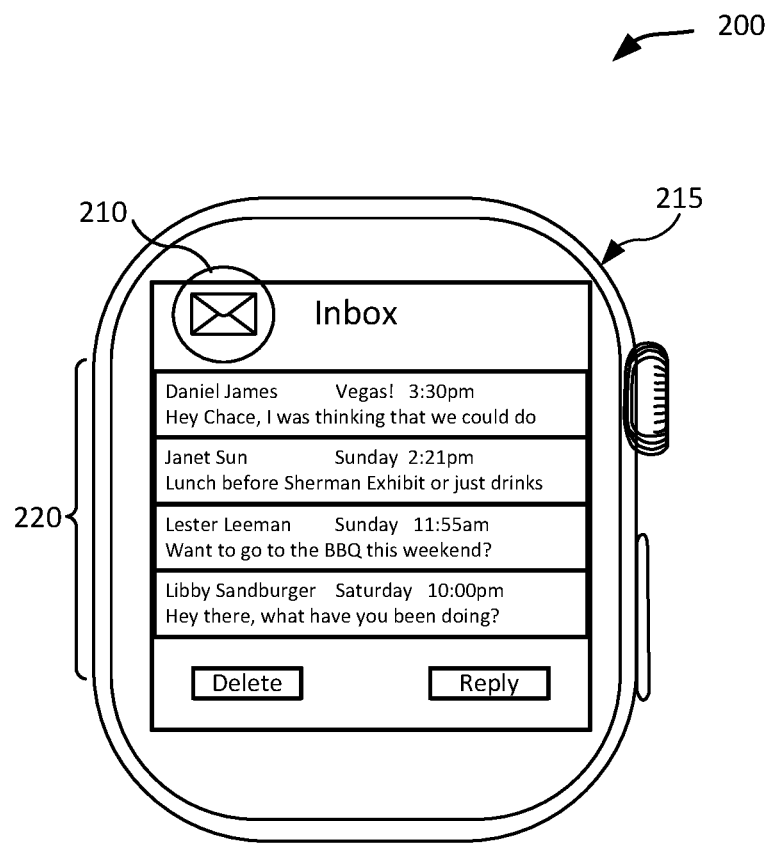
FIG. 2 illustrates a snapshot of an application on a mobile device, in accordance with some embodiments.

Upon selection of the preview mode, a snapshot of the inactive application can be centrally displayed on the display. In addition, snapshots of suspended applications can be partially displayed to the right and/or left of the inactive application. As the user swipes right and/or left on the touch interface, the suspended applications can be centrally displayed while in the preview mode. When an application becomes centrally displayed, its state can change from suspended to inactive, with the difference being that a screenshot of an inactive application is updated, while a screenshot of a suspended application can be updated periodically as a snapshot. Although a central display is described, this is merely an example and an application may be partially displayed. When an application is centrally displayed, the application, a snapshot of the application can be a main focus on the display. For example, as shown in FIG. 2, which is described in greater detail below, the e-mail application 210 is displayed centrally on a display of the mobile device 215. However, the application my not be centrally displayed and may be partially displayed such that all of the content of a screenshot of the application may not appear displayed on the display of the mobile device.

The transition from suspended to inactive can occur when the application becomes settled in a central location on the display. When a user settles on an application, and therefore, the application is in a settled state, the user has stopped scrolling through the applications and has stopped on a particular application. That is, an application can be centrally displayed on the user interface. When the user stops on a particular application that is centrally displayed, the application can be activated or launched.

At block 130, it is determined whether a settled application is in a central location on a display of the computing device is a suspended application. Block 130 is an example of an application being selected for viewing in an inactive state such that a screenshot of the application is updated on the display. Accordingly, the selection of an application to be in an inactive state can be based on a location of the application's screenshot on the display. In other embodiments, other factors besides a central display can be used, as is discussed in more detail below. For example, an application can communicate a request to the operating system to update its screenshot.

At block 150, if a user settles on a first application, which is already in an inactive state and is therefore not in a suspended state, then the screenshot of that application can be updated so as to be up-to-date. That is, a screenshot of the inactive application, which is up-to-date, is displayed since the inactive application is allocated processing time. The updating can be performed continuously or actively so that whenever new content is received, the application will be provided with sufficient processing resources to update the content of the application. Therefore, a system according to the embodiments, can continuously determine whether the application needs additional resources. Alternatively, instead of continuously allocating processing time, whenever processing time is determined to be needed by an application, the application can request additional processing time in order to keep the application up-to-date. The amount of processing time provided to an application can vary according to the type of application and resources needed by the application. Therefore, the amount of updating performed can vary according to the type or requirements of a particular application.

At block 140, if a user settles on, for example, a second application, which is any of the other applications that are in a suspended state, the second application that is in the suspended state will change to an inactive state. Specifically, since the second application is now in an inactive state, the second application can be allocated processing time and a screenshot of the application can be updated at block 150. Although the described example is with respect to an application in a suspended state, the method can also apply to an application that is, for example, in a not-in-memory state, which will be described in greater detail below. A not-in-memory state may occur when a memory of the computing device is not large enough for all of the applications designated for the preview mode.

As the second application continues to be centrally positioned on the display of the mobile device (e.g., the user is still viewing the second application in the preview mode), then the second application will be updated. Specifically, a screenshot of the second application may be continuously updated and a user can see the most recent content for the second application while in the preview mode. If the user swipes right or left, then the process can be repeated for each other suspended applications that the user settles on.

B. Application Snapshot

An application can be represented in a preview mode by a snapshot of the application. A snapshot can also be referred to as a screen image or application preview. A snapshot is a screenshot of an application at a particular point in time. A snapshot can show content and information of the application (e.g., the weather right now, a current stock price, the latest news).

FIG. 2 illustrates a snapshot 200 of an application on a mobile device 215 (e.g., wearable device, such as a smartwatch), in accordance with some embodiments. Specifically, the snapshot in FIG. 2 is of an e-mail application 210. At the time of the snapshot, four emails 220 were displayed on the display of the mobile device. However, the snapshot of the e-mail application can change over time. In addition, snapshots can be made for all of the applications that are currently open on the mobile device.

As shown in FIG. 2, the snapshot of the e-mail application includes the e-mail application content. However, alternatively, one or more of the applications in a preview mode can be represented by an icon associated with the application. Therefore, if a snapshot displaying content of the application is not available, a user can still readily determine which applications are currently open.

When an application is open, a snapshot of the application when it was last used can be stored in a memory. For example, a snapshot of one or more of the applications that are currently open on a user's mobile device can be stored in a memory. If a user was in an e-mail application, then the snapshot can be a screen of the e-mail application based on the last time the user used the e-mail application. For example, if the user had five emails in their inbox, then the snapshot can be an image of the e-mail application with the five emails. Therefore, when the user views the applications in the preview mode, a snapshot of the application is displayed. As content changes, the snapshot of the application in the preview mode can be updated.

After the user browses the snapshots of the different applications in the preview mode, the user may select a particular snapshot or icon that represents an application and thereby cause the application to be launched and put in an active state. Once the application is launched, the application is in full screen mode and is placed in the foreground. In some embodiments, the snapshot of the application and the view of the application launched in full screen mode display the same view of the application.

C. Preview Mode

Applications that are designated for the dock or preview mode, by, for example, a user, can be applications which are displayed in the dock or preview mode. In addition, applications that are currently open on a user's mobile device or a designated number of open applications can also be viewed in a dock or preview mode. For example, a user may specify that they would like the last N number of applications they have accessed to be available for viewing in the preview mode. A most recent snapshot of each of the applications is stored in a memory and can be displayed in the preview mode. In addition, icons of applications can also be displayed in the preview mode.

In some embodiments, the preview mode can include all of the applications that are open on the user's mobile device or can include a subset (e.g., less than all of the currently open applications) of the applications that are open on the user's mobile device. When a user selects to view the preview application, the dock can show previews (e.g., snapshots) of applications that are currently open on the mobile device.

Figure 3A:
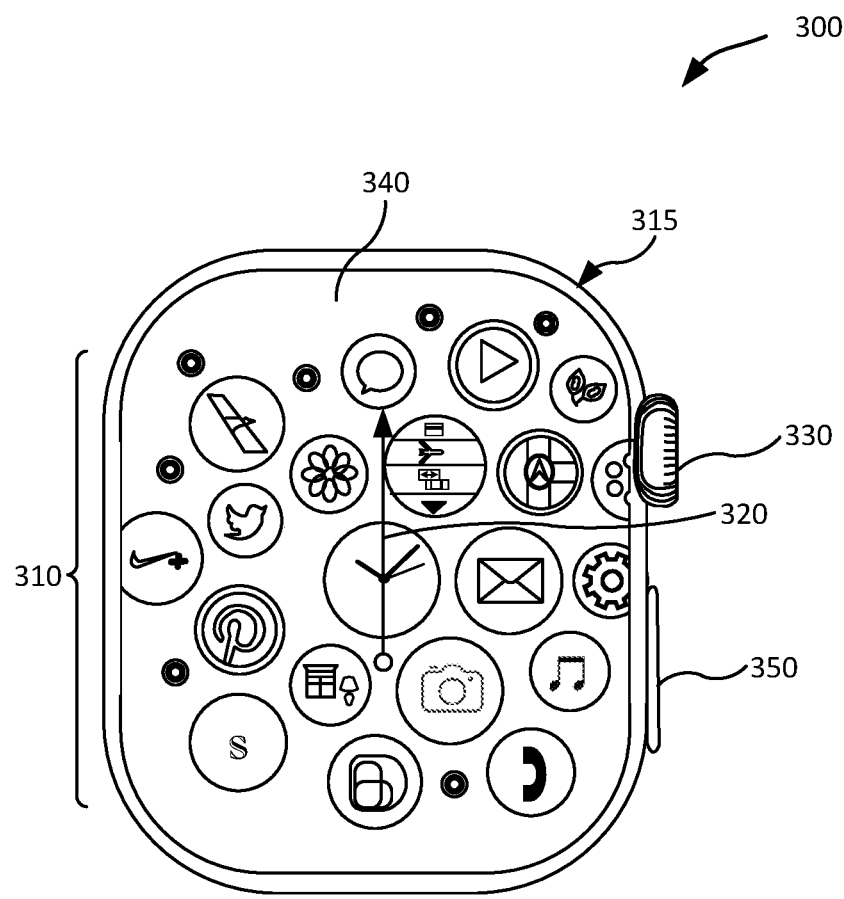
FIGS. 3A and 3B illustrate a user interface for selecting a preview mode and viewing applications in the preview mode, in accordance with some embodiments.
Figure 3B:
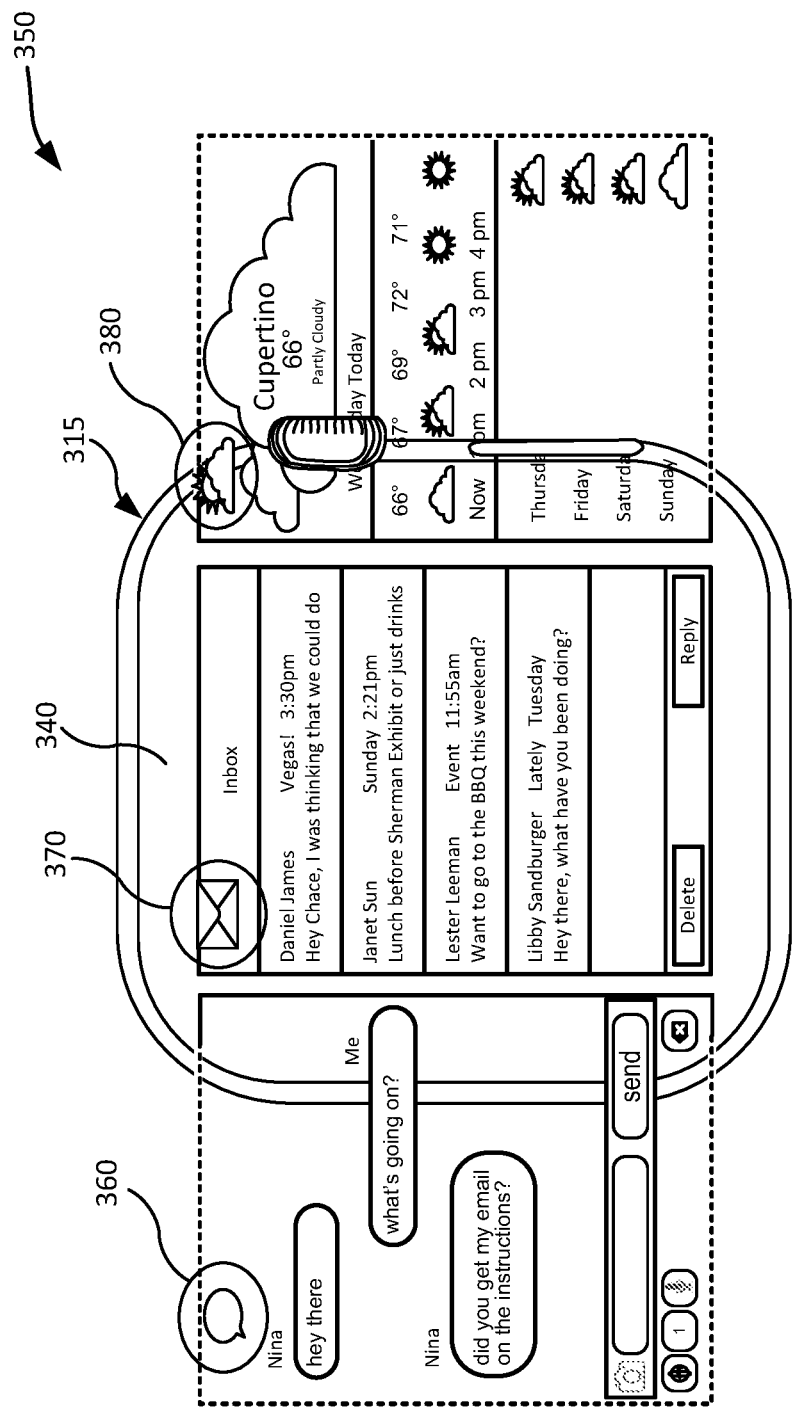

FIGS. 3A and 3B illustrate a user interface for selecting a preview mode and viewing applications in the preview mode, in accordance with some embodiments.

FIG. 3A illustrates an example home screen 300 of a mobile device 315, such as a smartwatch. A smartwatch can also be known as a wearable device.

The mobile device 315 can include a touchscreen-enabled graphical user interface 340 displaying several icons 310 on its home screen. The one or more icons 310 can represent applications that are available on the mobile device. The applications can include email applications, messaging applications, workout applications, camera applications, timer applications, music applications, home applications, etc. The applications can also include third party applications. These applications are merely examples and various kinds of applications can be available on a mobile device.

A user may launch or activate an application by selecting (e.g., tapping) an application icon 310 on graphical user interface 340, by zooming in on an icon using digital crown 330, by manipulating side button 350, or by other selection means.

A user can access a preview mode by, for example, swiping up, as shown by element 320, on the user interface 340 while on the home screen. Although swiping up is described, other gestures and commands can be used to access the preview mode. For example, tapping or double tapping on the user interface 340, selecting the digital crown 330, selecting side button 350, or selecting an icon from among the application icons 310 can be used to select the preview mode.

FIG. 3B illustrates an example view of the preview mode after the user has selected to view or activate the preview mode (e.g., swiping up on user interface, selecting preview mode icon, etc.). The user interface 340 may display one or more application snapshots in which each of the snapshots represent different applications.

As shown in FIG. 3B, the most recently accessed application 370 is centrally displayed. That is, the last application that the user was interacting with is centrally displayed on the display. In FIG. 3B, the most recently accessed application is an e-mail application. The user can swipe to the right to access application 360 (e.g., messaging application) or the user can swipe to the left to access application 380 (e.g., weather application). As the user swipes to the right or to the left through the applications, portions of a next or previous application can be displayed. Although swiping right and left on the user interface is described, swiping can also be performed up and down. In addition, other commands in addition to or alternative to the swiping, can be used to navigate through the applications in the preview mode, such as, tilting the mobile device, selecting the digital crown, or selecting the side button, etc.

Although three applications are shown in FIG. 3B, the preview mode can be used display more than three applications or less than three applications. Specifically, the preview mode can be used to display all applications that are currently open on the mobile device or the preview mode can be used to display a subset of all applications that are currently open on the mobile device. For example, the display can be adjusted to display several applications on the display at a given time.

The snapshots of the applications in the preview mode may be updated as the user scrolls through the preview mode. Updating of the applications snapshots is described in greater detail below. These processes enable the user to view updated application data while navigating across snapshots in the preview mode.

II. Application States

Applications can have different states. In accordance with some embodiments, applications can be assigned a particular state or policy. Based on the state or policy of the application, application data regarding the application (e.g., snapshot of the application), can be updated accordingly. Specifically, applications will operate according to their assigned state. Therefore, content of an application will be displayed to a user based on the state of the application. A system in accordance with the embodiments can provide the application with full, partial, or limited access to resources of the mobile device, e.g., memory and time for a processor of the computing device.

Applications can have, for example, an active state, an inactive state, a suspended state, or a not-in-memory state. An active state, an inactive state, a suspended state, and a not-in-memory state can be assigned to an application. In some embodiments, an application may request to be in a particular state (e.g., inactive state), referred to as an application preferred state. An application can be assigned an inactive state, a suspended state, and a not-in-memory state while the application is in the preview mode. Active, inactive, and suspended are states that can be visible to the respective application. Further, active, inactive, and suspended states can represent the visibility and interactivity of the application.

A. Active State

In an active state, an application is in the foreground and is user-interactive. That is, an application can have an active state when an application is not in a preview mode. For some computing devices, the application can take up the full window (i.e., full screen) of the display and ideally will be provided all necessary resources to operate. For example, an application can enter an active state when the user selects the application. When the user subsequently launches the application (e.g., selects the application via the user interface by tapping on the application), the application can be displayed in an active state and can be controlled by a user. An active state is visible to the application.

In an active state, the content of the application is updated and the updated information is being displayed on the display of the mobile device. The updating can be performed continuously or actively. Specifically, the application will be provided with sufficient processing memory in runtime in order to provide updates to the application as well as allow for user interaction (e.g., data manipulation and access). Therefore, while in an active state, a user can see up-to-date changes in the application and the user can interact with the application.

Figure 4A:
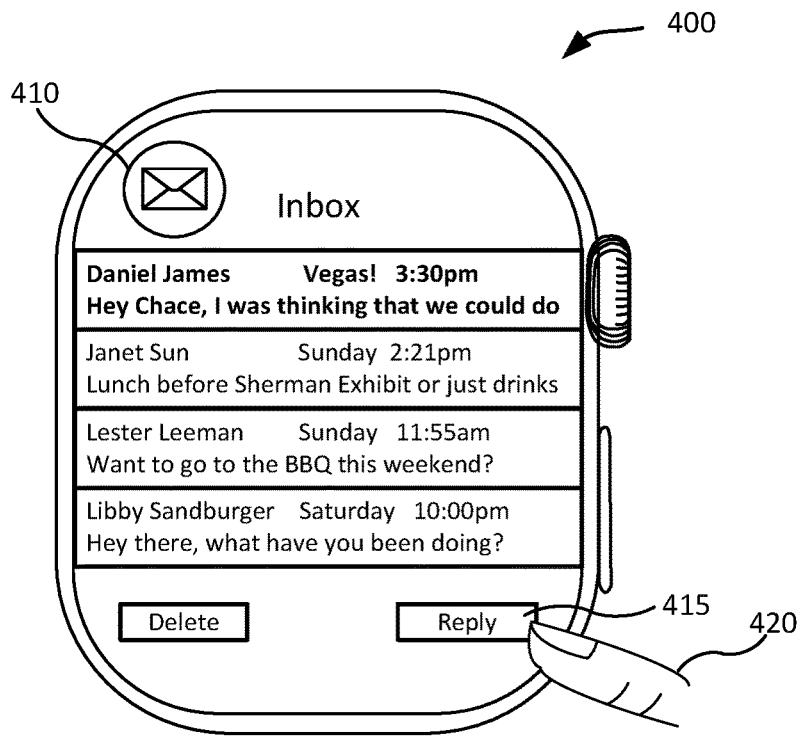
FIGS. 4A and 4B illustrate an application in an active state, in accordance with some embodiments.
Figure 4B:
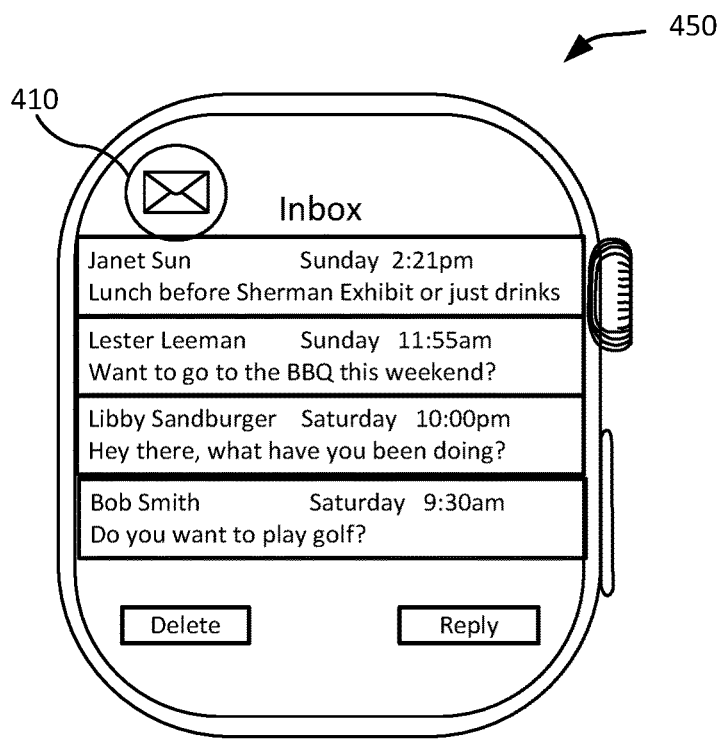

FIGS. 4A and 4B illustrate an application in an active state, in accordance with some embodiments. FIG. 4A illustrates a view 400 of an e-mail application 410 at a first time period and FIG. 4B illustrates a view 450 of the e-mail application 410 at a second time period. The second time period is a different time period from the first time period (e.g., 30 seconds later). In FIGS. 4A and 4B, the user 420 has launched the e-mail application from the preview mode and therefore, the email application is now live. That is, the application is appearing in the foreground in a full screen and is user-interactive.

As shown in FIGS. 4A and 4B, the content of the application is being updated. For example, after the user 420 has replied to an email by selecting the reply button 415, the e-mail can be deleted and other emails can be displayed in the snapshot of the application, as shown in FIG. 4B.

When the application in being updated, for example, during the transition of the screenshot from FIG. 4A to FIG. 4B, the screenshot of the application can appear to be animated. For example, the screenshot can appear to be changing as content is received.

B. Inactive State

In an inactive state, content of the application can be updated, however, the user cannot interact with the application. For example, if an e-mail application is in an inactive state in the preview mode, new e-mails can be received, however, a user cannot reply to the e-mail. The user cannot reply to the new e-mail until the user places the application in an active state by, for example, launching the application being viewed in the preview mode (e.g., tap on the application). In an inactive state, an application can be visible on the display in the preview mode. Although the term inactive is used, this is merely used to refer to a state between an active state and a suspended state, in which there is more limited updating being performed than in an active state and more limited computing resources are being provided than in an active state. An inactive state is visible to the application.

Therefore, in an inactive state, a snapshot of an application can be changing and animating, however, the application is not user interactive. That is, the application is in an updated mode. Specifically, the application will be provided with sufficient processing memory in order to provide updates to the application in runtime. Therefore, while in an inactive state, a user can see up-to-date changes in the application, but the user is not interacting with the application.

Further, an application in an inactive state may receive some but not all changes occurring with the application. For example, a workout application may usually light up one or more heartrate sensors, but since the application knows it has been assigned an inactive state, when the user scrolls past the workout application in the preview mode, the heartrate sensors will not light up.

Figure 5A:
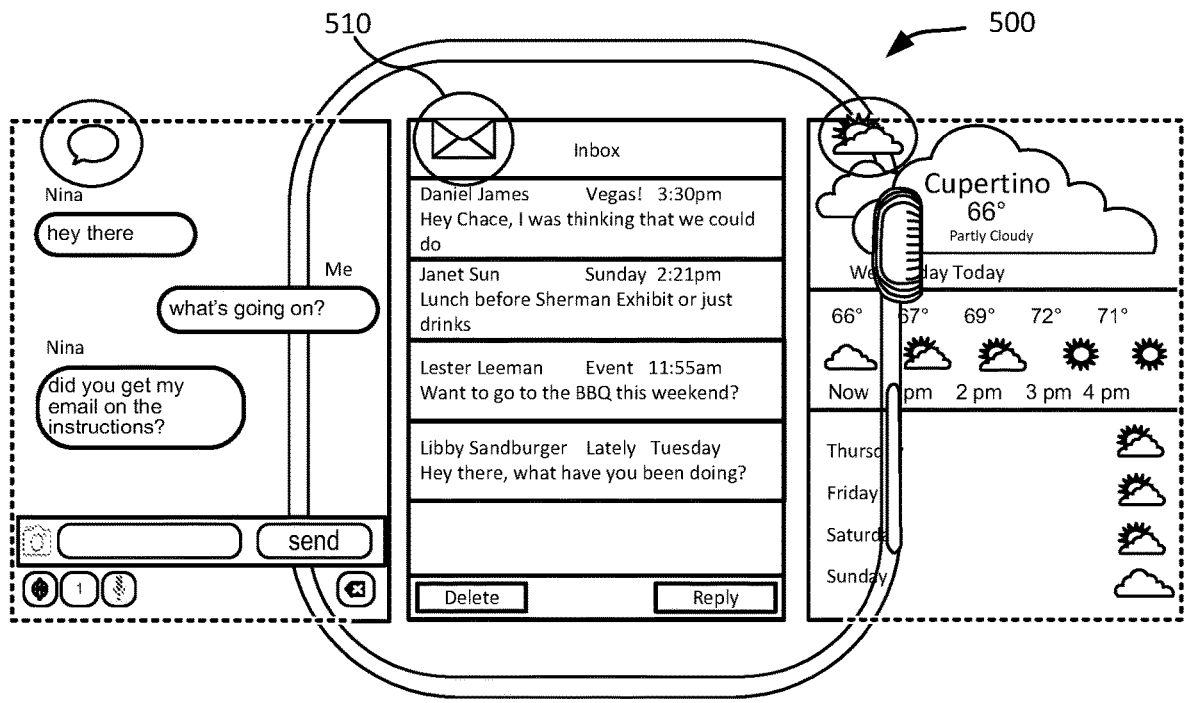
FIGS. 5A and 5B illustrate an application in an inactive state, in accordance with some embodiments.
Figure 5B:
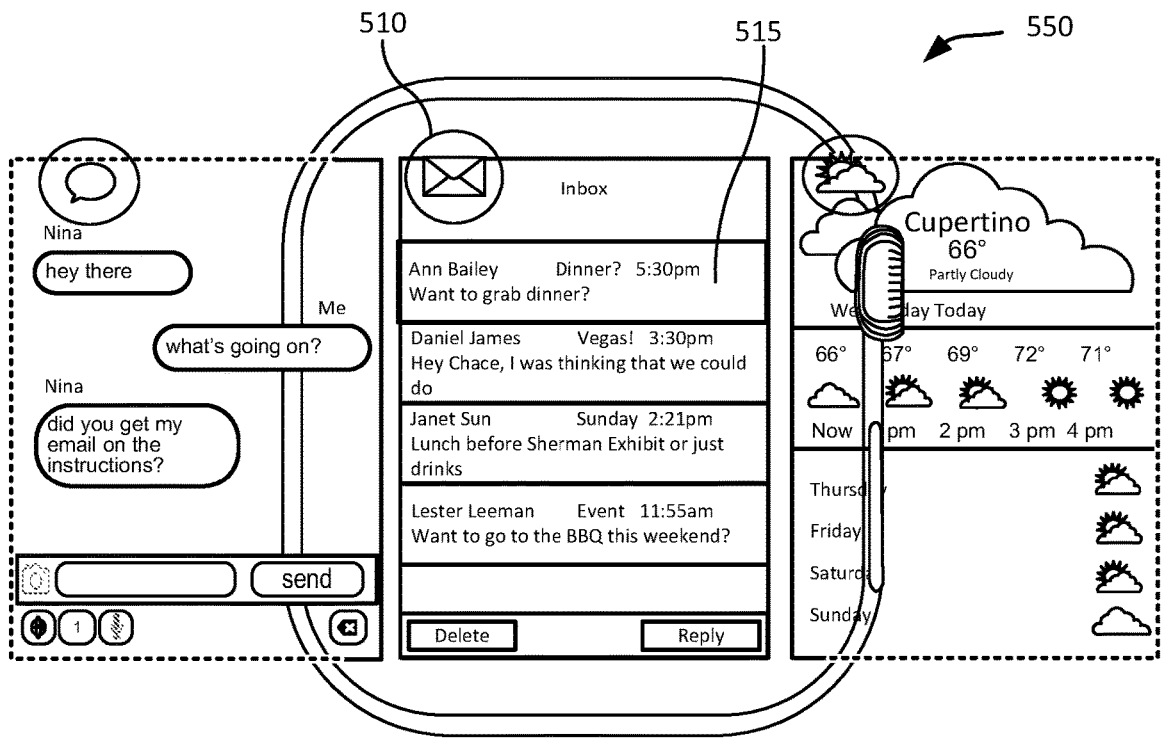

FIGS. 5A and 5B illustrate an application in an inactive state, in accordance with some embodiments. FIG. 5A illustrates a view 500 of an e-mail application 510 in the preview mode at a first time period and FIG. 5B illustrates a view 550 of the e-mail application in a preview mode at a second time period. The second time period is a different time period from the first time period (e.g., 30 seconds later). In FIGS. 5A and 5B, the e-mail application 510 is being viewed in the preview mode that is being displayed on the user interface. Therefore, although the e-mail application content is being updated, the e-mail application remains in the background and is not user-interactive. That is, the user cannot, for example, reply to e-mails or send e-mails while the application is in an inactive state, however, the user can see that a new e-mail 515 has been received in FIG. 5B.

When the application is being updated, for example, during the transition of the screenshot from FIG. 5A to FIG. 5B, the screenshot of the application can appear to be animated. For example, the screenshot can appear to be changing as content is received.

C. Suspended State

In a suspended state, an application will be provided with minimal processing memory. Specifically, in a suspended state an application will be given sufficient memory to stop running the application in run time and clean up any pending matters with the application. In a suspended state, the snapshot of the application will remain static. That is, the content of the application will no longer be updated. Therefore, in a suspended state a user can see a static snapshot of the application. The snapshot of the application will not be updated since the user's last interaction with the application (e.g., when application was last active) and the user cannot interact with the application. In a suspended state, the application may not be visible on a display of the mobile device and the user cannot interact with the application. A suspended state is visible to the application.

Figure 6A:
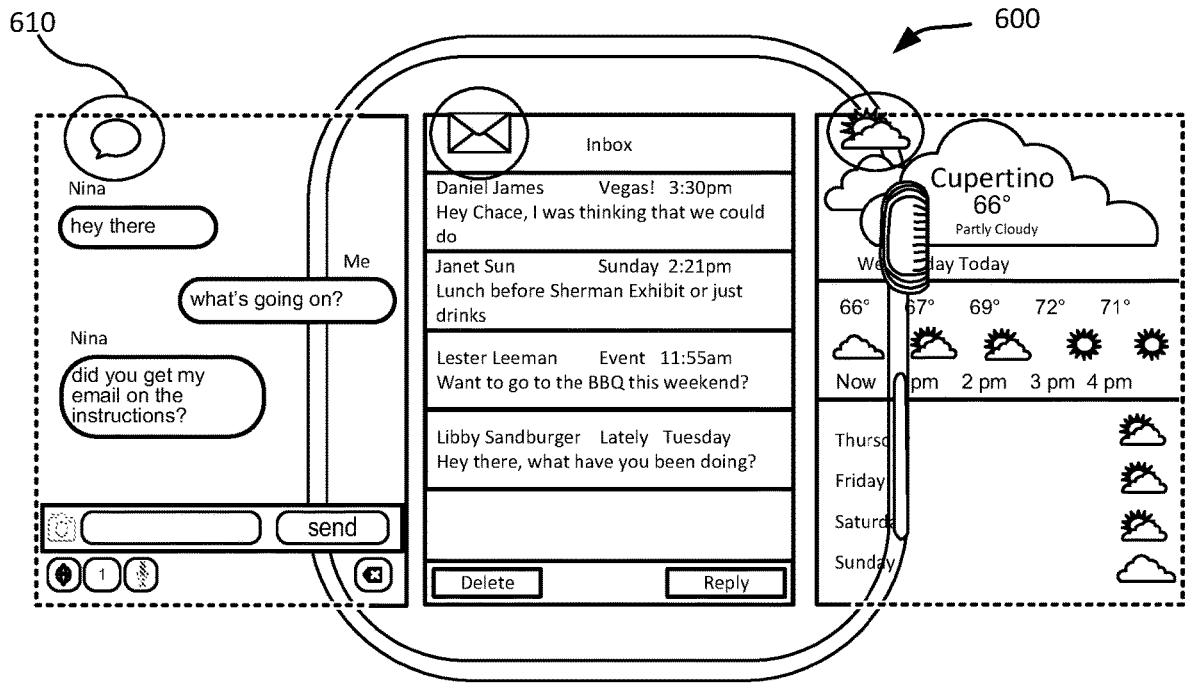
FIGS. 6A and 6B illustrate an application in suspended state, in accordance with some embodiments.
Figure 6B:
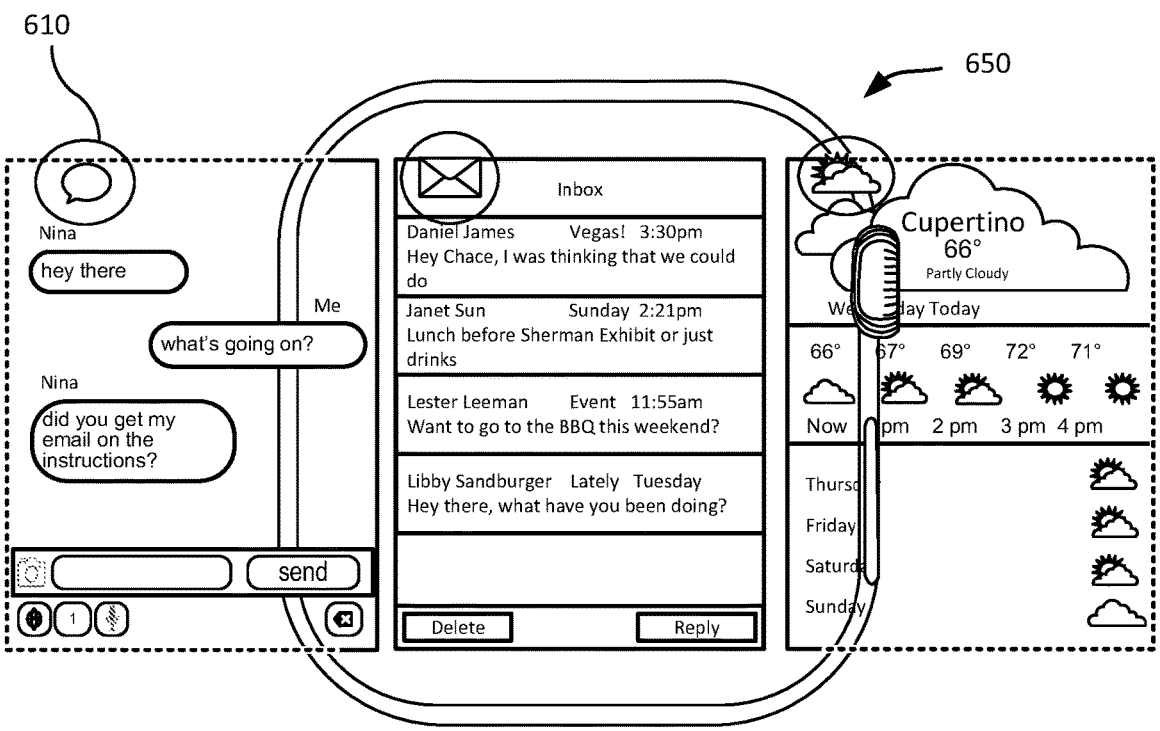

FIGS. 6A and 6B illustrate an application in suspended state, in accordance with some embodiments. FIG. 6A illustrates a view 600 of a messaging application 610 in the preview mode at a first time period and FIG. 6B illustrates a view 650 of the messaging application in a preview mode at a second time period. The second time period is a different time period from the first time period (e.g., 30 seconds later). In FIGS. 6A and 6B, the messaging application 610 is being viewed in the preview mode that is being displayed on the user interface. As shown in FIGS. 6A and 6B, the snapshot of the messaging application between the figures remains the same and is static. Therefore, although new messaging content is being received, the snapshot of the application is not being updated. That is, the user cannot see, for example, that new messages (e.g., text messages) have been received since the screenshot of the messages application remains the same.

D. Not-in-Memory State

A not-in-memory state can be treated similar to the suspended state. However, in a not-in-memory state, none of the runtime memory is allocated to the application. In a not-in-memory state, the snapshot of the application will remain static. That is, the content of the application will no longer be updated. Therefore, in a not-in-memory state a user can see a static snapshot of the application. The snapshot of the application will not be updated since the user's last interaction with the application and the user cannot interact with the application. If a snapshot of an application needs to be updated, the application can be loaded in memory, and another application can be removed, if necessary, in order to provide sufficient resources for updating the snapshot.

The view of an application in a non-in-memory state will be the same as that of a suspended state since the snapshot of the application remains static.

Although the views have been described in relation to an e-mail application and a messaging application, that is for purposes of simplicity. For example, different types of applications can be assigned the different types of states.

E. Application Preferred State

In addition to or separate from an assigned state of an application, an application can also indicate a preferred state (e.g., an application can broadcast its preferred state to the system). An application preferred state can refer to an application rendering policy or rendering hint. That is, an application's preference for rendering data. The preference information can be used by the system to determine a most appropriate application state given, for example, resource availability and/or how a user is interacting with the preview mode.

Application preferred states can include, for example, live, semi-static/semi-live or never live. Live, semi-static/semi-live or never live can be different levels of a request. Live, semi-static, and never live can be a hint to the system about how often application content needs to be updated while in the preview mode. For example, an application which is live should be allowed to render soon. An application which is semi-static may render less frequently while visible in the preview mode (e.g., only once per invocation of the preview mode). An application which is never live may never be given any time to render in the preview mode since a snapshot of the application would be sufficient to display meaningful data about that application to the user.

For example, if an application sends a live request, then the request can indicate that the application wants to be in an inactive state. If an application sends a semi-static or semi-live request, the request can indicate that the application wants to be in an inactive state. If an application sends a never-live request, the request can indicate that the application wants to be in a not-in-memory state.

Further, a timer application can indicate that it must always be in a live state. Therefore, updated timer information can be displayed when a user views the application in the preview mode. Further, although an application may indicate a preferred state, a system in accordance with some of the embodiments may determine that the application will be assigned a different state. For example, if an application wants to be live, but is consuming too many resources, the system may not move the application from the suspended state to inactive state or may not move the application from the suspended state to inactive state as quickly as it might otherwise do for an application that is operating as instructed (e.g., a well-behaving application. An application can be a well-behaving application based on, for example, an application's usage of system resources (e.g., CPU usage, input/output (I/O), contributions regarding length of time to render a frame to the screen, etc.). Further, based on, for example, system policies, it can be determined whether an application is using too many resources and throttling when an application is resumed from the suspended state to the inactive state.

An application can change from any of a first state (e.g., active, inactive, suspended, not-in-memory) to a second state (e.g., active, inactive, suspended, not-in-memory) that is different from the first state. That is, if an application is in an active state, it can change to an inactive, suspended, and not-in-memory state. The transition from an active state or inactive state to a not-in-memory state can occur when an application crashes. If an application is in an inactive state, it can change to an active, suspended, and not-in-memory state. If an application is in a suspended state, the application can change to an active, inactive, or not-in-memory state. If an application changes from a suspended state to an active state, then an application can be launched. If an application is in a non-in-memory state, the application can change to an active, inactive, or suspended state. The changing of an application that is in a non-in-memory state to an active or inactive state can be considered as launching the application.

In addition, if an application changes its preferred state, then the changing of its state can trigger another application to change its state (e.g., change from suspended to inactive) since resources will now be available.

III. System for Improving Application Viewing

A preview mode management system of a mobile device can be used to determine the processing capabilities provided to an application. That is, based on the state information provided or assigned to the application in the preview mode, the application can determine how it should proceed (e.g., what resources it can use, what functions it should continue to operate, stop or start, etc.).

A. System Overview

It would be beneficial if snapshots of all of the open applications are updated. However, updating all open applications (e.g., so that all applications are up-to-date) can be a drain on resources of the mobile device. For example, updating all open applications can drain the memory as well as drain the battery of the mobile device. Therefore, in accordance with some embodiments, an intelligent system is disclosed for updating applications while preventing the draining of resources. Specifically, applications will appear as live as possible to a user, without draining resources of the mobile device.

Figure 7:
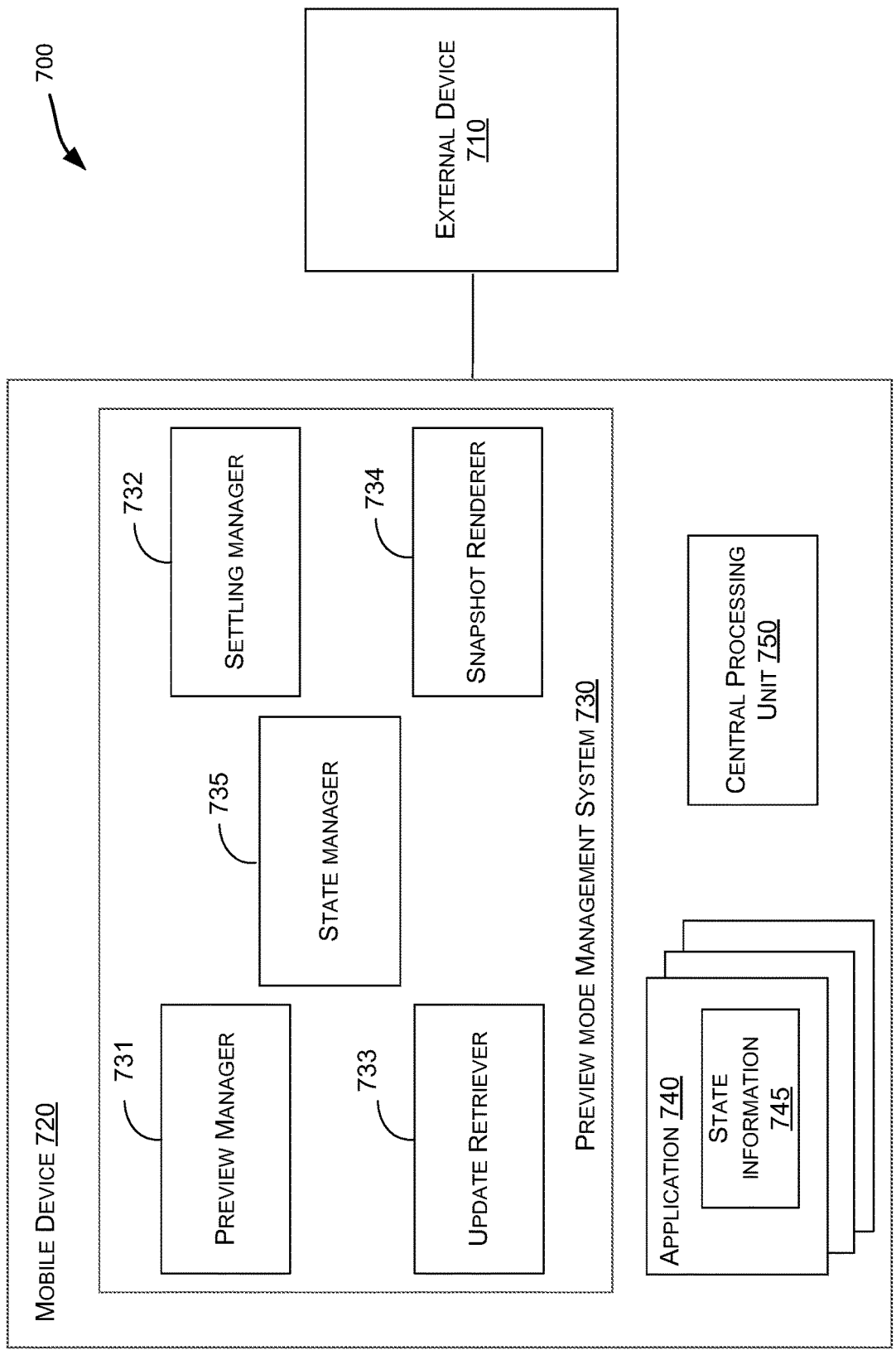
FIG. 7 illustrates a block diagram of a system for improving application viewing, in accordance with some embodiments.

FIG. 7 illustrates a block diagram of an example system 700 for improving application viewing, in accordance with some embodiments. The system 700 includes a mobile device 720 communicatively coupled to an external device 710 (e.g., via a communication network (not shown here)). Mobile device 720 can include one or more applications 740, a preview mode management system 730, and a central processing unit 750.

Preview mode management system 730 can include multiple components including preview manager 731, settling manager 732, update retriever 733, snapshot renderer 734 and state manager 735. One or more communication paths may be provided that enable the components to communicate with and exchange data with each other. The components may be implemented in software, hardware (e.g., one or more processors), or a combination thereof. In certain embodiments, the software may be stored on a non-transitory computer-readable storage medium and executed by one or more processors.

Mobile device 720 can be of various different types, including, but not limited to handheld devices, such a mobile phone, a tablet, etc. or a wearable device, such as a smartwatch, a tracking device, electronic glasses, etc. and other types of devices. External device 710 may be of various different types, including, but not limited to personal computers, desktops, mobile or handheld devices, such as a laptop, a mobile phone, a tablet, etc., and other types of devices. A communication network can facilitate communications between one or more external devices 710 and mobile device 720. A mobile device can also be referred to as a computing device.

The communication network can be of various types and can include one or more communication networks. Examples of a communication network include, without restriction, the Internet, a wireless personal area network, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols.

A user may request to view a preview mode using mobile device 720. In some embodiments, the preview mode may include snapshots of various applications 740. Applications 740 can include state information 745. State information 745 can include an applications preferred state or a state that is assigned to the application (e.g., active, inactive, suspended, not-in-memory, etc.) by, for example, state manager 735.

Preview mode management system 730 can update snapshots for applications 740 and present the snapshots in the preview mode. By keeping the snapshots of the applications in the preview mode updated via the preview manager 731, the user can navigate among the multiple applications and get a glimpse of current application data before launching the application (e.g., into full screen).

In certain embodiments, preview manager 731 can identify the applications that have been selected to be part of the preview mode. While there may be several applications installed and running on mobile device 720, in some embodiments, applications 740 that have been selected to be part of the dock may be a subset of the full set of applications installed on mobile device 720 where the subset is less than the full set of applications.

In some embodiments, one or more applications 740 that are part of the preview mode can be selected by the user, designated by a system administrator (e.g., mobile device manufacturer), selected based on user history (e.g., most frequently used by the user within a certain time period or more recently used by the user), or selected based on a combination of the previously mentioned methods. Different embodiments may designate applications to be part of the dock differently. Further, different users may have different sets of applications that are part of the dock on their mobile devices.

Settling manager 732 can determine whether a user as settled on a particular application in the preview mode. The settling manager 732 can determine whether a user has stopped on an application in the preview mode. If the user has stopped on an application, the settling manager 732 can determine whether the application should be activated or launched.

Update retriever 733 can receive requests from application(s) 740 and retrieve updates for application(s) 740 with either external device 710 or with the application servers. Update retriever 733 may retrieve application updates (or allow application(s) 740 to retrieve application updates). In some instances, the frequency of updating the applications can be determined based on the number of applications in the dock, the total number of updates for all the applications allowed within a time period, whether one application does not need to be updated in a certain time period thereby allowing another application to be able to update more frequently, etc.

Snapshot renderer 734 can render the snapshots for applications 740 in the preview mode. In some embodiments, when each application obtains updated application data, snapshot renderer 734 can take a snapshot of a screen of the application that includes the updated application data. Snapshot renderer 734 may then present the snapshot of the application as the user navigates across the different snapshots of applications presented in the preview mode.

State manager 735 can manage the states of each of the applications in the mobile device. State manager can determine that current state of an application and can determine what state to assign to an application. For example, the state manager 735 can determine whether an application is in an active state, an inactive state, a suspended state, a not-in-memory state. The state manager 735 can also determine if an application has a preferred state.

In addition, the state manager 735 can determine whether an application should be switched to any one of an active state, an inactive state, a suspended state, a not-in-memory state. Based on the state of an application determined by state manager 735, the snapshot renderer 734 can determine how frequently a snapshot of an application should be obtained. Therefore, resources of the mobile device 720 can be efficiently managed.

The state manager 735 can assign states to applications according to a variety of different factors such as category, grouping, user activity, application preferred state, historical data, etc.

B. System for Assigning State

Figure 8:
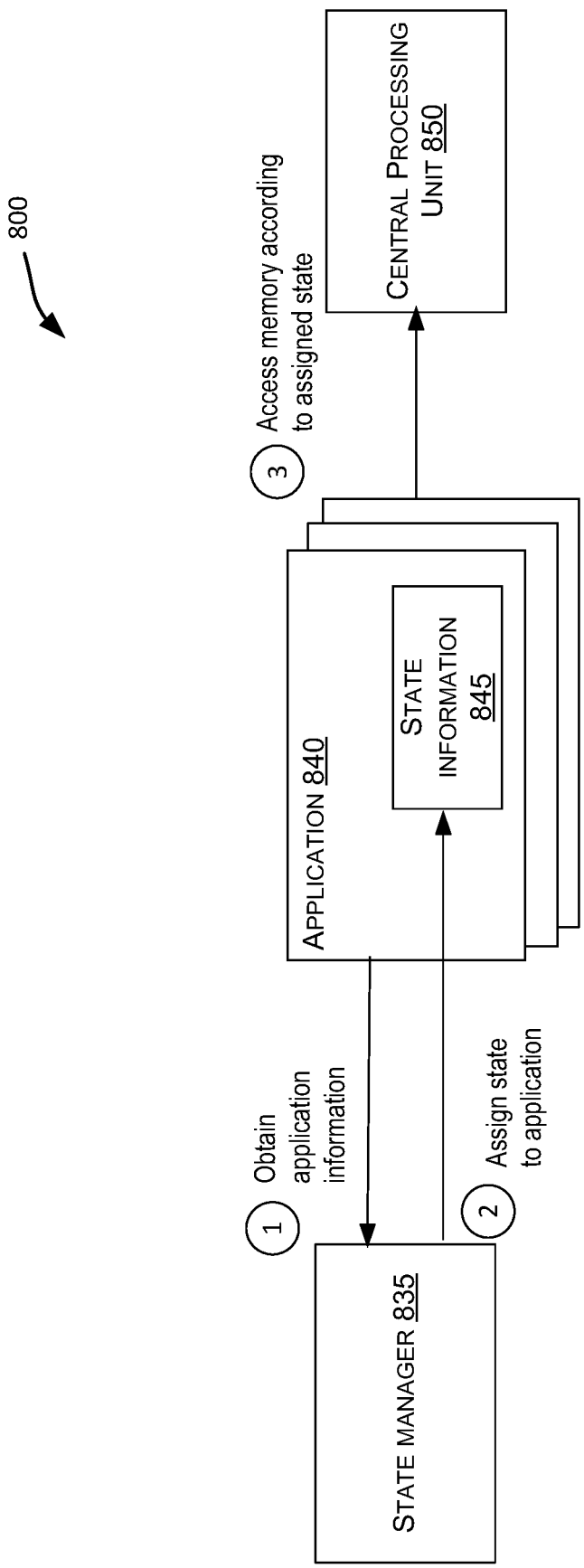
FIG. 8 illustrates a block-diagram of a system including a process flow for assigning a state and allocating processing resources, in accordance with some embodiments.

FIG. 8 illustrates a block-diagram of a system 800 including a process flow for assigning a state and allocating processing resources, in accordance with some embodiments.

The system 800 includes state manager 835, one or more applications 840 which include state information 845, and a central processing unit (CPU) 850. State manager 835, one or more applications 840, state information 845, and central processing unit (CPU) 850 can correspond to, for example, state manager 735, one or more applications 740, state information 745, and central processing unit (CPU) 750, respectively, as shown in FIG. 7.

The state manager 835 can assign states to applications according to a variety of different factors and based on the assigned state, the application 840 will access runtime memory resources accordingly.

Therefore, at step 1, the state manager can identify information about the application or obtain information from the application. For example, the state manager 835 can identify information such as a category of the application, a group that the application belongs to, user activity with the application, the application's preferred state, and historical data about the application. The types of information identified above are merely examples and additional information can be used to identify a state to assign to an application. In addition, one or more of these types of information can be used to determine a state to assign to an application.

The state manager 835 can assign states to applications according to a category or a grouping of the applications. Content of particular types can be grouped together. For example, active complications on a watch face can be grouped together. In addition, the state manager 835 may determine that particular applications belongs to a group of applications that will be assigned a default state. For example, state manager 835 may determine that all applications are assigned a suspended state until there is an indication from the application that the state should be changed. Therefore, the state manager 835 can act as a scheduler for the applications and will allow applications access the CPU 850 accordingly.

The state manager 835 can also determine a state of an application or whether an application should change states such as changing from, for example, a suspended state to an inactive state. For example, based on user activity in the preview mode (e.g., scrolling, panning, settling on an application), the state manager 835 can determine what state should be assigned to an application or whether a state of an application should change.

The state manager 835 can also determine whether an application has a preferred state. If an application has a preferred state, the state manager 835 can determine whether the application is allowed to enter the application preferred state or if the application should be assigned another state. In addition, the application can also inform the state manager 835 whether it requires a change in its state. For example, an application can inform the state manager 835 that it has new content, and that it would like its screenshot to be updated.

The state manager 835 can also assign a state of an application according to a history of the application. For example, if based on historical data, an application does not receive new content often, then the state manager 835 can determined that the application can be assigned a suspended state. However, if the state manager 835 determines, based on historical data, that an application regularly has new content, then the application can be assigned an inactive state.

One or more of these factors can be combined in determining a state to assign to an application state (e.g., category, grouping, user activity, application preferred state, historical data, etc.).

Based on the information about the application determined by the state manager 835, at step 2, the application 840 can be assigned a state. For example, the application 840 can be assigned one of an active state, an inactive state, a suspended state, or a not-in-memory state. In addition, the application 840 may be assigned its preferred state. The application's preferred state may be one of, for example, an active state, an inactive state, a suspended state, or a not-in-memory state. The application's assigned state can be stored in state information 845. In addition, the application's state information (i.e., preferred state information) can also be stored in state information 845. In addition, state information can also be stored in a system scheduler.

After the application 840 has been assigned a state, at step 3, the application 840 will then be allocated processing memory in the central processing unit (CPU) 850. For example, a scheduler can allocate CPU time.

The embodiments depicted in FIGS. 7 and 8 are merely examples and are not intended to unduly limit the embodiments. One of ordinary skill in the art would recognize many variations, alternatives, and modifications to the embodiments. For example, there may be more or fewer components in preview mode management system 730 than those shown in FIG. 7.

Further, one or more components shown in preview mode management system 730 can be part of external device 710 and may not all be performed by mobile device 720.

IV. Method

Figure 9:
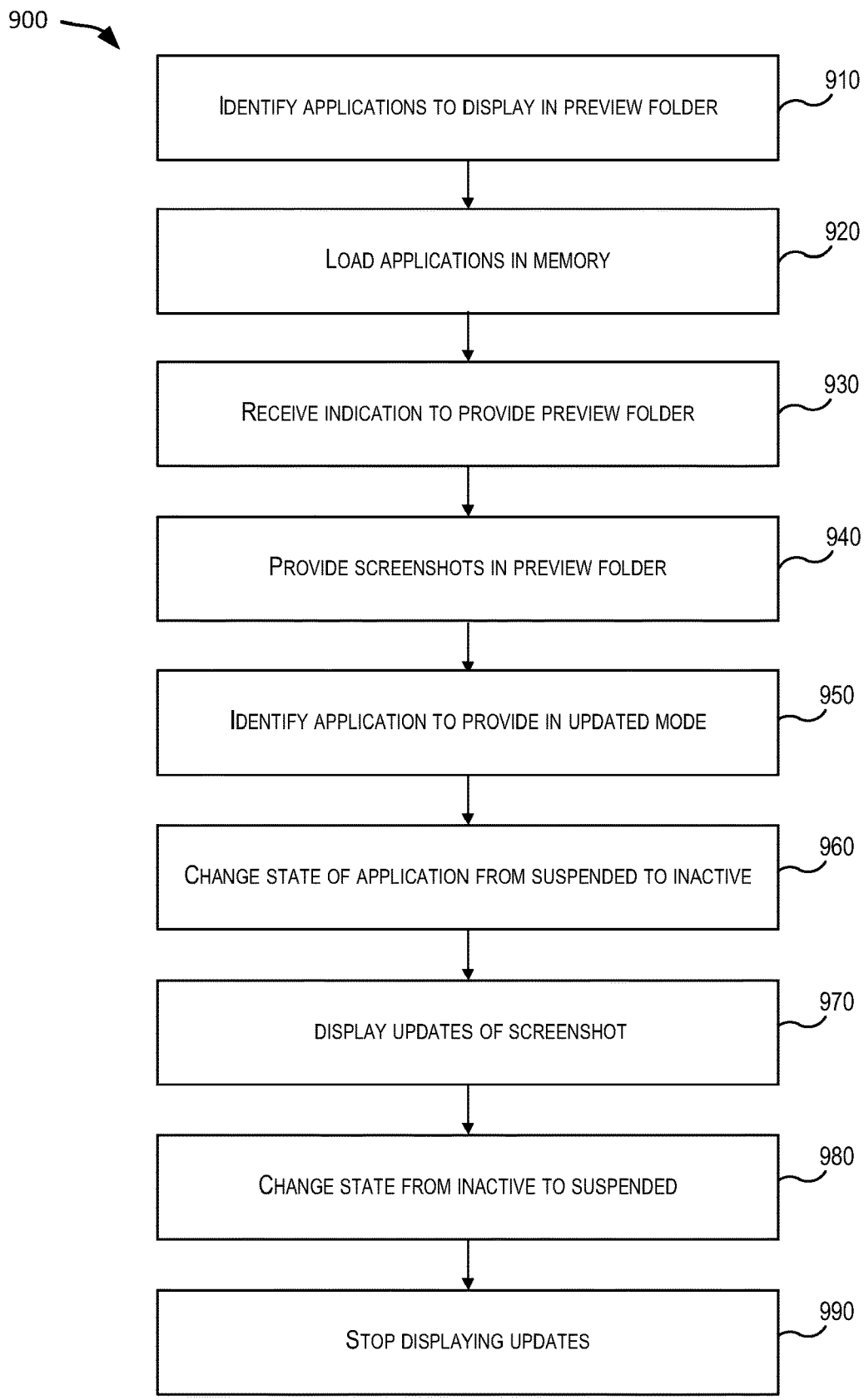
FIG. 9 illustrates a flowchart of a method of improving application viewing according to state, in accordance with some embodiments.

FIG. 9 illustrates a flowchart of a method 900 of improving application viewing according to state, in accordance with some embodiments. The method described in FIG. 9 can include elements similar to the method disclosed in FIG. 1.

At block 910, a plurality of applications for which screenshots are to be displayed in a preview mode can be identified. A screenshot can also be called a snapshot or preview. A screenshot can be an image representing content of the plurality of applications. A screenshot can also be an icon representing the first application.

The plurality of applications can include a first application that provides a first screenshot. For example, a screenshot can be provided for an e-mail application, a messaging application, and a workout application. The preview mode can display all applications that are open on the computing device or a subset of all of the applications that are open on the computing device At block 920, the plurality of applications can be loaded into a memory (e.g., RAM) of the mobile device. For example, the e-mail application, the messaging application, and the workout application can be loaded into the memory of the mobile device.

At block 930, an indication to provide the preview mode on a display of the mobile device can be received at a user interface of the mobile device. For example, the user can swipe up on a home screen or select an icon for launching the preview mode. The applications for which screenshots are to be displayed in the preview mode are applications that are currently open on the computing device.

At block 940, the screenshots for the plurality of applications can be provided in the preview mode such that the screenshots are accessible for viewing by a user. For example, the screenshots may be accessible by moving the screenshots onto and off the display. In one implementation, the user can swipe right and/or left to view additional screenshots.

At block 950, a first application to provide the first screenshot in an updated mode is identified. The first application is identified based on a first location of the first screenshot on the display. For example, if the e-mail application is centrally displayed and the user has settled on the e-mail application in the preview mode, then it is determined that the e-mail screenshot should be updated. A settled state occurs when the user stops moving the screenshots of the plurality of applications onto and off the display and the first application is centrally displayed on the display.

At block 960, in response to the identifying the first application, a state of the first application is changed from a suspended state to an inactive state. In a suspended state, the first screenshot of the first application is not updated and the user cannot interact with the first application. The first application is allocated minimal processing time in order to stop updating the first screenshot of the first application. In a suspended state, the first screenshot remains static while the user views the first application displayed in the preview mode.

When the first application is changed to the inactive state, the first screenshot of the first application is updated and the user cannot interact with the first application. The first screenshot of the first application can be updated so that a change to content in the first application is represented in the first screenshot. Also, the first screenshot of the first application can be updated so that the first screenshot is a most recent representation of content in the first application. During the updating of the first application, the screenshot can appear to be animated as new application content is provided.

In the inactive state, the first application is allocated processing time. For example, the first application is allocated processing time in order for the first application to update the first screenshot with updated first application content. Other applications which are in a suspended state are not allocated processing time at this time.

At block 970, a screenshot for the first application that is in the active state is updated and the updates of the screenshots for the first applications are displayed on the display. That is, as new content or information is received, the screenshot of the first application will be updated to represent the new content. Therefore, a screenshot of the first application can be updating as new content and/or information for the first application is received.

At block 980, the state of the first application can change from an inactive state to a suspended state based on a changed location of the first screenshot on the display. For example, if the user is swiping to a next application in the preview mode, then the state of the first application can change to a suspended state because the user is no longer settled on the first application.

At block 990, the system stops displaying screenshot updates for the first application since it is changing to a suspended state. That is, the displaying of updates is stopped and the first application is allocated minimal processing time in order to stop updating the first screenshot of the first application.

V. Example Mobile Device

Figure 10:
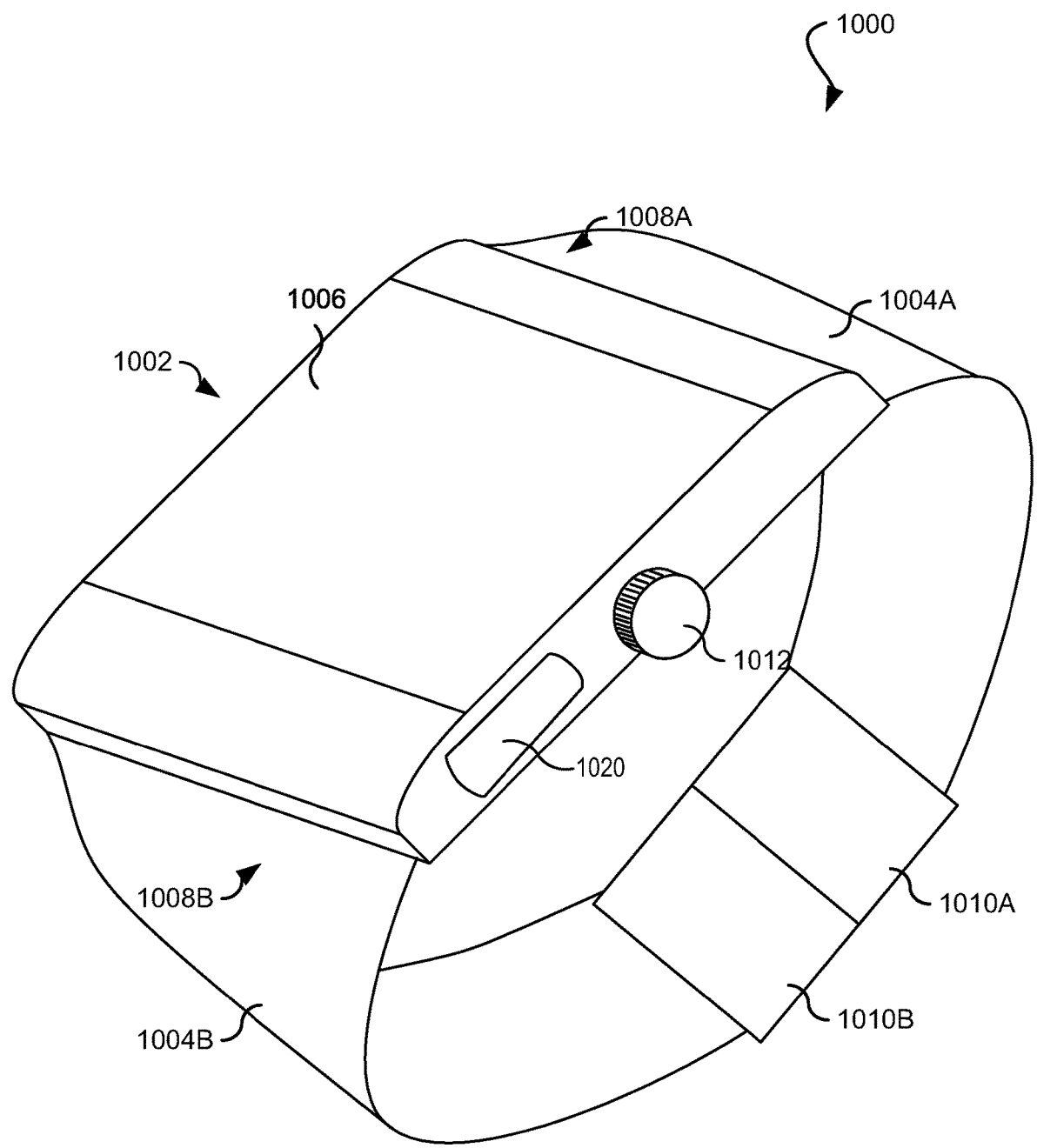
FIG. 10 illustrates wearable device for displaying applications in a preview mode, in accordance with some embodiments.

Embodiments described herein may take the form of, be incorporated in, or operate with a suitable electronic device or computing device. One example of such a device is shown in FIG. 10 and takes the form of a wearable mechanism (e.g., the mobile device 720 of FIG. 7 or another type of smart device). Alternative embodiments of suitable electronic devices include a mobile phone, a tablet computing device, a portable media player, and so on. Still other suitable electronic devices may include laptop/notebook computers, personal digital assistants, touch screens, input-sensitive pads or surfaces, and so on.

FIG. 10 illustrates a wearable device 1000 for displaying applications in a preview mode, in accordance with some embodiments. In this example, wearable device 1000 is shown as a wristwatch-like device (e.g., smartwatch) with a face portion 1002 connected to straps 1004A, 1004B. In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Face portion 1002 can include, e.g., a touchscreen display 1006 that can be appropriately sized depending on where on a user's person the wearable device 1000 is intended to be worn. A user can view information presented by wearable device 1000 on touchscreen display 1006 and provide input to wearable device 1000 by touching touchscreen display 1006. In some embodiments, touchscreen display 1006 can occupy most or all of the front surface of face portion 1002.

Straps 1004A, 1004B can be provided to allow wearable device 1000 to be removably worn by a user, e.g., around the user's wrist, and secured thereto. In some embodiments, straps 1004A, 1004B can be made of any flexible material (e.g., fabrics, flexible plastics, leather, chains or flexibly interleaved plates or links made of metal or other rigid materials) and can be connected to face portion 1002, e.g., by hinges. Alternatively, straps 1004A, 1004B can be made of a rigid material, with one or more hinges positioned at the junction of face portion 1002 and proximal ends 1008A, 1008B of straps 1004A, 1004B and/or elsewhere along the lengths of straps 1004A, 1004B to allow a user to put on and take off wearable device 1000. Different portions of straps 1004A, 1004B can be made of different materials; for instance, flexible or expandable sections can alternate with rigid sections. In some embodiments, one or both of straps 1004A, 1004B can include removable sections, allowing wearable device 1000 to be resized to accommodate a particular user's wrist size. In some embodiments, straps 1004A, 1004B can be portions of a continuous strap member that runs behind or through face portion 1002. Face portion 1002 can be detachable from straps 1004A, 1004B; permanently attached to straps 1004A, 1004B; or integrally formed with straps 1004A, 1004B.

The distal ends of straps 1004A, 1004B opposite face portion 1002 can provide complementary clasp members 1010A, 1010B that can be engaged with each other to secure the distal ends of straps 1004A, 1004B to each other, forming a closed loop. In this manner, device 1000 can be secured to a user's person, e.g., around the user's wrist; clasp members 1010A, 1010B can be subsequently disengaged to facilitate removal of device 1000 from the user's person. The design of clasp members 1010A, 1010B can be varied; in various embodiments, clasp members 1010A, 1010B can include buckles, magnetic clasps, mechanical clasps, snap closures, etc. In some embodiments, one or both of clasp members 1010A, 1010B can be movable along at least a portion of the length of corresponding strap 1004A, 1004B, allowing wearable device 1000 to be resized to accommodate a particular user's wrist size.

Straps 1004A, 1004B can be two distinct segments, or they can be formed as a continuous band of an elastic material (including, e.g., elastic fabrics, expandable metal links, or a combination of elastic and inelastic sections), allowing wearable device 1000 to be put on and taken off by stretching a band formed straps 1004A, 1004B. In such embodiments, clasp members 1010A, 1010B can be omitted.

Straps 1004A, 1004B and/or clasp members 1010A, 1010B can include sensors that allow wearable device 1000 to determine whether it is being worn at any given time. Wearable device 1000 can operate differently depending on whether it is currently being worn or not. For example, wearable device 1000 can inactivate various user interface and/or RF interface components when it is not being worn. In addition, in some embodiments, wearable device 1000 can notify a companion device (e.g., a smartphone, a mobile device, a tablet device, a media player, a speaker, or other electronic devices) when a user puts on or takes off wearable device 1000.

In various embodiments, wearable device 1000 includes a rotary input such as a crown 1012 (also referred to as digital crown). Crown 1012 can be used to perform a variety of functions. In some embodiments, crown 1012 provides rotation input for navigating content (e.g., zooming in and out of content, panning across content). In this example, crown 1012 includes a plastic or metal crown body, preferably having conventional outer teeth. Typically, a pedestal made integral with the body of crown 1012 is positioned and protrudes into face portion 1002. Crown 1012 may be fastened, either permanently or removably, to hardware associated with wearable device 1000. Rotation of the crown (and/or a stem) may be sensed optically, electrically, magnetically, or mechanically. Further, in some embodiments the crown (and/or stem) may also move laterally, thereby providing a second type of input to the device.

Wearable device 1000 can also include a side button 1020 which can be used to perform additional functions. For example, side button 1020 can be assigned a particular function according to an application that is currently active. The side button 1020 may be depressed to provide yet another input to the device. In various embodiments, the button may be a dome switch, rocker switch, electrical contact, magnetic switch, and so on. In some embodiments the button may be waterproof or otherwise sealed against the environment.

It will be appreciated that wearable device 1000 is illustrative and that variations and modifications are possible. For example, wearable device 1000 can be implemented in any wearable article, including a watch, a bracelet, a necklace, a ring, a belt, a jacket, or the like. In some instances, wearable device 1000 can be a clip-on device or pin-on device that has a clip or pin portion that attaches to the user's clothing. The interface portion (including, e.g., touchscreen display 1006) can be attached to the clip or pin portion by a retractable cord, and a user can easily pull touchscreen display 1006 into view for use without removing the clip or pin portion, then let go to return wearable device 1000 to its resting location. Thus, a user can wear wearable device 1000 in any convenient location.

Wearable device 1000 can be implemented using electronic components disposed within face portion 1002, straps 1004A, 1004B, and/or clasp members 1010A, 1010B.

Figure 11:
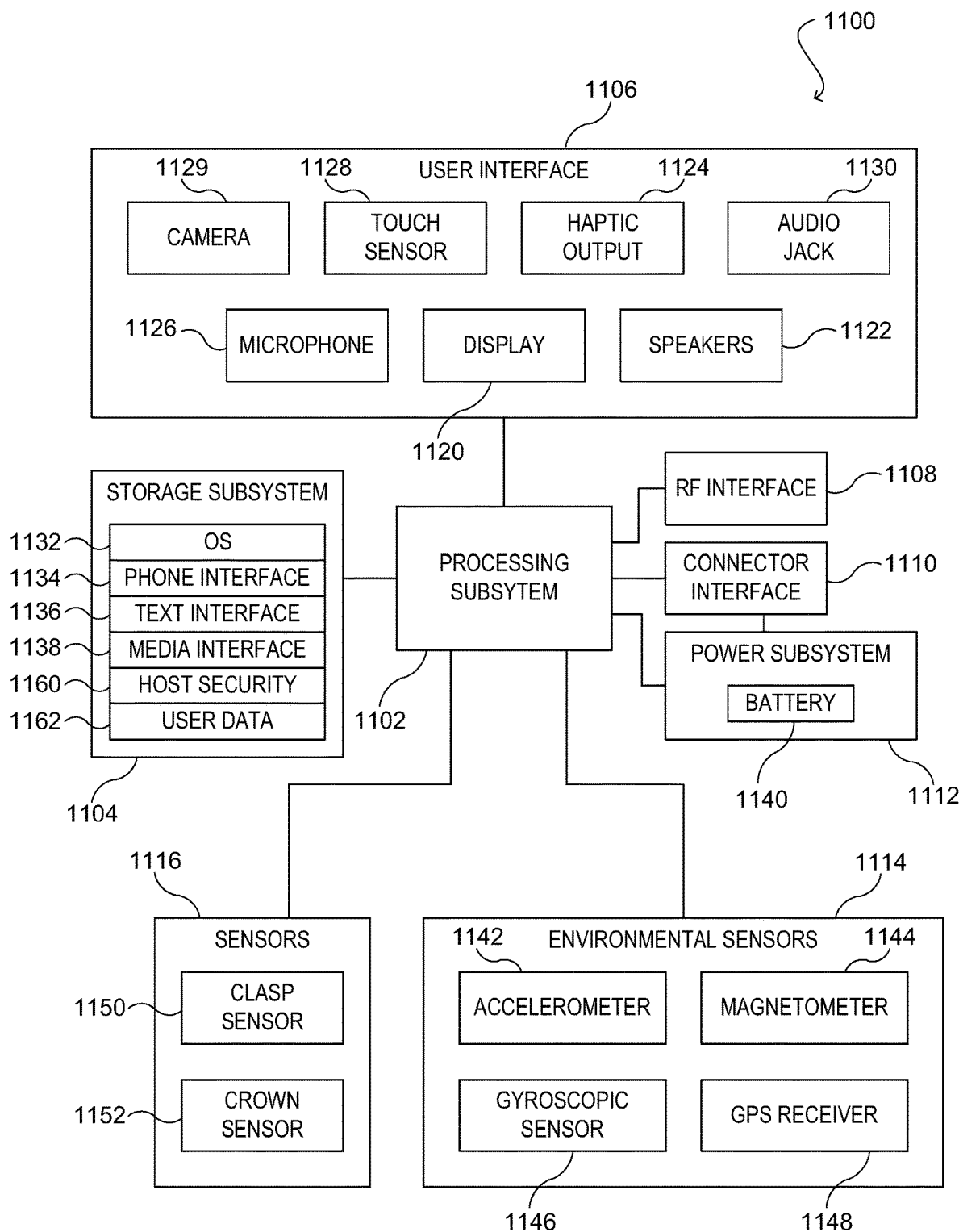
FIG. 11 illustrates a simplified block diagram of a wearable device, in accordance with some embodiments.

FIG. 11 is a simplified block diagram of the wearable device of FIG. 10, in accordance with some embodiments. Wearable device 1100 can include processing subsystem 1102, storage subsystem 1104, user interface 1106, RF interface 1108, connector interface 1110, power subsystem 1112, environmental sensors 1114, and sensors 1116. Wearable device 1100 can also include other components (not explicitly shown).

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Storage subsystem 1104 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 1104 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 1104 can also store one or more application programs to be executed by processing subsystem 1102 (e.g., video game programs, personal information management programs, media playback programs, interface programs associated with particular host devices and/or host device functionalities, etc.).

User interface 1106 can include any combination of input and output devices. A user can operate input devices of user interface 1106 to invoke the functionality of wearable device 1100 and can view, hear, and/or otherwise experience output from wearable device 1100 via output devices of user interface 1106.

Examples of output devices include display 1120, speakers 1122, and haptic output generator 1124. Display 1120 can be implemented using compact display technologies, e.g., LCD (liquid crystal display), LED (light-emitting diode), OLED (organic light-emitting diode), or the like. In some embodiments, display 1120 can incorporate a flexible display element or curved-glass display element, allowing wearable device 1100 to conform to a desired shape.

One or more speakers 1122 can be provided using small-form-factor speaker technologies, including any technology capable of converting electronic signals into audible sound waves. In some embodiments, speakers 1122 can be used to produce tones (e.g., beeping or ringing) and can but need not be capable of reproducing sounds such as speech or music with any particular degree of fidelity. Haptic output generator 1124 can be, e.g., a device that converts electronic signals into vibrations; in some embodiments, the vibrations can be strong enough to be felt by a user wearing wearable device 1100 but not so strong as to produce distinct sounds.

Wearable device 1100 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Examples of input devices include microphone 1126, touch sensor 1128, and camera 1129. Microphone 1126 can include any device that converts sound waves into electronic signals. In some embodiments, microphone 1126 can be sufficiently sensitive to provide a representation of specific words spoken by a user; in other embodiments, microphone 1126 can be usable to provide indications of general ambient sound levels without necessarily providing a high-quality electronic representation of specific sounds.

Touch sensor 1128 can include, e.g., a capacitive sensor array with the ability to localize contacts to a particular point or region on the surface of the sensor and in some instances, the ability to distinguish multiple simultaneous contacts. In some embodiments, touch sensor 1128 can be overlaid over display 1120 to provide a touchscreen interface, and processing subsystem 1102 can translate touch events (including taps and/or other gestures made with one or more contacts) into specific user inputs depending on what is currently displayed on display 1120. In some embodiments, touch sensor 1128 can also determine a location of a touch on the cover glass. A touch sensor may be incorporated into or on the display stack in order to determine a location of a touch. The touch sensor may be self-capacitive in certain embodiments, mutual-capacitive in others, or a combination thereof.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

Camera 1129 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 1104 and/or transmitted by wearable device 1100 to other devices for storage. Depending on implementation, the optical components can provide fixed focal distance or variable focal distance; in the latter case, autofocus can be provided. In some embodiments, camera 1129 can be disposed along an edge of face portion 1002 of FIG. 10, e.g., the top edge, and oriented to allow a user to capture images of nearby objects in the environment such as a bar code or QR code. In other embodiments, camera 1129 can be disposed on the front surface of face portion 1002 of FIG. 10, e.g., to capture images of the user. Zero, one, or more cameras can be provided, depending on implementation.

In some embodiments, user interface 1106 can provide output to and/or receive input from an auxiliary device such as a headset. For example, audio jack 1130 can connect via an audio cable (e.g., a standard 2.5-mm or 3.5-mm audio cable) to an auxiliary device. Audio jack 1130 can include input and/or output paths. Accordingly, audio jack 1130 can provide audio to the auxiliary device and/or receive audio from the auxiliary device. In some embodiments, a wireless connection interface can be used to communicate with an auxiliary device.

Processing subsystem 1102 can be implemented as any electronic device capable of processing, receiving, or transmitting data or instructions. Processing subsystem 1102 can include one or more integrated circuits. For example, processing subsystem 1102 may include one or more of: one or more single-core or multi-core microprocessors or microcontrollers, a central processing unit (CPU), an application-specific integrated circuit (ASIC), a digital signal processor (DSP), or additional or combinations of such devices. In operation, processing subsystem 1102 can control the operation of wearable device 1100. In various embodiments, processing subsystem 1102 can execute a variety of programs in response to program code and can maintain multiple concurrently executing programs or processes. At any given time, some or all of the program code to be executed can be resident in processing subsystem 1102 and/or in storage media such as storage subsystem 1104.

Through suitable programming, processing subsystem 1102 can provide various functionality for wearable device 1100. For example, in some embodiments, processing subsystem 1102 can execute an operating system (OS) 1132 and various applications for interfacing with a host device, such as a phone-interface application 1134, a text-interface application 1136, and/or a media interface application 1138. In some embodiments, some or all of these application programs can interact with a host device, e.g., by generating messages to be sent to the host device and/or by receiving and interpreting messages from the host device. In some embodiments, some or all of the application programs can operate locally to wearable device 1100. For example, if wearable device 1100 has a local media library stored in storage subsystem 1104, media interface application 1138 can provide a user interface to select and play locally stored media items. Examples of interface applications are described below.

In some embodiments, processing subsystem 1102 can also execute a host security process 1160 that provides support for establishing and maintaining a verified communication session with a host device. A verified communication session can provide an enhanced level of security, and various operations of wearable device 1100 and/or a host device can be made conditional on whether a verified communication session between the devices is in progress. For instance, host security process 1160 can facilitate unlocking a host device when wearable device 1100 is present, depending on whether a verified session is in progress. User data 1162 can include any information specific to a user, such as identification information, user-specified settings and preferences, customized information (e.g., contacts, predefined text messages), and any other user-related data or content. In some embodiments, executing applications and processes can access user data 1162 to facilitate operations.

RF (radio frequency) interface 1108 can allow wearable device 1100 to communicate wirelessly with various host devices. RF interface 1108 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 1108 can be implemented using a combination of hardware (e.g., driver circuits, antennas, modulators/demodulators, encoders/decoders, and other analog and/or digital signal processing circuits) and software components. In some embodiments, RF interface 1108 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 1108. Wearable device 1100 may wirelessly communicate with a sales terminal nearby, thus permitting a user to quickly and efficiently conduct a transaction such as selling, buying, or returning a good. Wearable device 1100 may use NFC technology to perform these and other functions.

Connector interface 1110 can allow wearable device 1100 to communicate with various host devices via a wired communication path, e.g., using Universal Serial Bus (USB), universal asynchronous receiver/transmitter (UART), or other protocols for wired data communication. In some embodiments, connector interface 1110 can provide a power port, allowing wearable device 1100 to receive power, e.g., to charge an internal battery. For example, connector interface 1110 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from a host device in analog and/or digital formats.

In some embodiments, connector interface 1110 and/or RF interface 1108 can be used to support synchronization operations in which data is transferred from a host device to wearable device 1100 (or vice versa). For example, as described below, a user can customize certain information for wearable device 1100 (e.g., a "favorite" contacts list and/or specific predefined text messages that can be sent). While user interface 1106 can support data-entry operations, a user may find it more convenient to define customized information on a separate device (e.g., a tablet or smartphone) that has a larger interface (e.g., including a real or virtual alphanumeric keyboard), then transfer the customized information to wearable device 1100 via a synchronization operation. Synchronization operations can also be used to load and/or update other types of data in storage subsystem 1104, such as media items, application programs, and/or operating system programs. Synchronization operations can be performed in response to an explicit user request and/or automatically, e.g., when wearable device 1100 resumes communication with a particular host device or in response to either device receiving an update to its copy of synchronized information.

Environmental sensors 1114 can include various electronic, mechanical, electromechanical, optical, or other devices that provide information related to external conditions around wearable device 1100. Sensors 1114 in some embodiments can provide digital signals to processing subsystem 1102, e.g., on a streaming basis or in response to polling by processing subsystem 1102 as desired. Any type and combination of environmental sensors can be used; shown by way of example are accelerometer 1142, a magnetometer 1144, a gyroscope sensor 1146, and a GPS receiver 1148.

Some environmental sensors can provide information about the location and/or motion of wearable device 1100. For example, accelerometer 1142 can sense acceleration (relative to freefall) along one or more axes, e.g., using piezoelectric or other components in conjunction with associated electronics to produce a signal. Magnetometer 1144 can sense an ambient magnetic field (e.g., Earth's magnetic field) and generate a corresponding electrical signal, which can be interpreted as a compass direction. Gyroscope sensor 1146 can sense rotational motion in one or more directions, e.g., using one or more MEMS (micro-electro-mechanical systems) gyroscopes and related control and sensing circuitry. Global Positioning System (GPS) receiver 1148 can determine location based on signals received from GPS satellites.

Other sensors can also be included in addition to or instead of these examples. For example, a sound sensor can incorporate microphone 1126 together with associated circuitry and/or program code to determine, e.g., a decibel level of ambient sound. Temperature sensors, proximity sensors, ambient light sensors, or the like can also be included. The ambient light sensor may permit the device to sense a brightness of its environment and adjust certain operational parameters accordingly. For example, wearable device 1100 may modify a brightness of a display in response to the sensed ambient light. As another example, wearable device 1100 may turn the display off if little or no light is sensed for a period of time.

Sensors 1116 can include various electronic, mechanical, electromechanical, optical, or other devices that provide information to wearable device 1100. For instance, clasp sensor 1150 can be at least partially disposed within either or both of clasp members 1010A, 1010B of FIG. 10 and can detect when clasp members 1010A, 1010B are engaged with each other or disengaged from each other. For example, engaging clasp members 1010A, 1010B to each other can complete an electrical circuit, allowing current to flow through clasp sensor 1150; disengaging clasp members 1010A, 1010B from each other can break the circuit. As another example, one or more crown sensors 1152 can be disposed to detect input from crown 1012 of FIG. 10. Crown sensors 1152 can also include motion sensors, accelerometers, pressure sensors (e.g., piezoelectric devices), or the like.

Any other type of sensor can be used in addition to or instead of the sensors disclosed in FIG. 11. For instance, physiological or biometric sensors, such as pulse sensors, ECG sensors, or the like can be provided. In some embodiments, physiological sensors can monitor a user's physiological signals and provide health-related information based on those signals. In certain embodiments, physiological or biometric sensors can be used in verifying the identity of the wearer of wearable device 1100.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. In some embodiments, the device may also measure blood pressure, ultraviolet exposure, etc. Depending on the sensors incorporated into or associated with the electronic device, a variety of user characteristics may be measured and/or estimated, thereby permitting different health information to be provided to a user. In some examples, the sensed biometric information may be used by the alert manager, in part, for managing the electronic content and/or the incoming alerts.

Similarly, wearable device 1100 may include a force sensor (not shown here) to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

Power subsystem 1112 can provide power and power management capabilities for wearable device 1100. For example, power subsystem 1112 can include a battery 1140 (e.g., a rechargeable battery) and associated circuitry to distribute power from battery 1140 to other components of wearable device 1100 that require electrical power. In some embodiments, power subsystem 1112 can also include circuitry operable to charge battery 1140, e.g., when connector interface 1110 is connected to a power source. In some embodiments, power subsystem 1112 can include a "wireless" charger, such as an inductive charger, to charge battery 1140 without relying on connector interface 1110. An inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes. In some embodiments, power subsystem 1112 can also include other power sources, such as a solar cell, in addition to or instead of battery 1140.

In some embodiments, power subsystem 1112 can control power distribution to components within wearable device 1100 to manage power consumption efficiently. For example, power subsystem 1112 can automatically place wearable device 1100 into a "hibernation" state when strap sensors 1116 indicate that wearable device 1100 is not being worn. The hibernation state can be designed to reduce power consumption; accordingly, user interface 1106 (or components thereof), RF interface 1108, connector interface 1110, and/or environmental sensors 1114 can be powered down (e.g., to a low-power state or turned off entirely), while strap sensors 1116 are powered up (either continuously or at intervals) to detect when a user puts on wearable device 1100. As another example, in some embodiments, while wearable device 1100 is being worn, power subsystem 1112 can turn display 1120 and/or other components on or off depending on motion and/or orientation of wearable device 1100 detected by environmental sensors 1114. For instance, if wearable device 1100 is designed to be worn on a user's wrist, power subsystem 1112 can detect raising and rolling of a user's wrist, as is typically associated with looking at a wristwatch, based on information provided by accelerometer 1142. In response to this detected motion, power subsystem 1112 can automatically turn display 1120 and/or touch sensor 1128 on; similarly, power subsystem 1112 can automatically turn display 1120 and/or touch sensor 1128 off in response to detecting that user's wrist has returned to a neutral position (e.g., hanging down).

Power subsystem 1112 can also provide other power management capabilities, such as regulating power consumption of other components of wearable device 1100 based on the source and amount of available power, monitoring stored power in battery 1140, generating user alerts if the stored power drops below a minimum level, and so on.

In some embodiments, control functions of power subsystem 1112 can be implemented using programmable or controllable circuits operating in response to control signals generated by processing subsystem 1102 in response to program code executing thereon, or as a separate microprocessor or microcontroller.

It will be appreciated that wearable device 1100 is illustrative and that variations and modifications are possible.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Example embodiments of this disclosure are described herein. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising: receiving, by a wearable device, a designation of a plurality of applications to be included in a preview mode of the wearable device; storing, by the wearable device, a list of applications designated for the preview mode; identifying, by the wearable device, using the stored list, the plurality of applications on the wearable device that are in the preview mode, wherein the preview mode comprises displaying most recently updated views of screenshots for the plurality of applications in the preview mode, wherein the most recently updated view of a screenshot that is displayed on a display is updated at a time subsequent to a time that a user last accessed one of the plurality of applications; loading, by the wearable device, the plurality of applications that are in the preview mode into a memory of the wearable device; receiving, by the wearable device, at a user interface of the wearable device, an indication to provide the preview mode on the display of the wearable device; and providing, by the wearable device, the screenshots of the plurality of applications in the preview mode such that the screenshots are accessible for viewing by the user, the screenshots of the plurality of applications in the preview mode being accessible by moving the screenshots onto and off the display via a touch interface of the display.

2. The method according to claim 1, wherein designating the plurality of applications to be included in the preview mode comprises receiving a selection of one or more applications stored on the wearable device for display in the preview mode.

3. The method according to claim 2, wherein all of the selected applications are displayed in the preview mode.

4. The method according to claim 2, wherein a predetermined number of the selected applications are displayed in the preview mode.

5. The method according to claim 2, wherein the selection of the one or more applications for display in the preview mode is received by the wearable device from a mobile device that is separate from the wearable device.

6. The method according to claim 1, wherein the loading the plurality of applications that are in the preview mode into the memory of the wearable device comprises:
   identifying a predetermined file size for the one or more applications to be loaded into the memory of the wearable device; and
   loading the one or more applications, within the predetermined file size, into the memory of the wearable device.

7. The method according to claim 1, wherein the loading the plurality of applications that are in the preview mode into the memory of the wearable device comprises:
   determining one or more applications that are open on the wearable device; and
   loading the one or more applications that are open on the wearable device in the preview mode.

8. The method according to claim 1, wherein the loading the plurality of applications that are in the preview mode into the memory of the wearable device comprises:
   determining one or more applications that are most recently used by the user; and
   loading the one or more applications that are most recently used by the user in the preview mode.

9. The method according to claim 8, wherein the determining the one or more applications that are most recently used by the user comprises determining the one or more applications used within a predetermined time period.

10. The method according to claim 1, wherein the designation of the plurality of applications to be included in the preview mode of the wearable device is received from the user.

11. The method according to claim 1, wherein the wearable device is a smartwatch, and wherein the plurality of applications are configured to be viewed on a display of the smartwatch.

12. A computer product comprising a non-transitory computer readable medium storing a plurality of instructions that when executed control a wearable device including one or more processors, the instructions comprising:
   receiving a designation of a plurality of applications to be included in a preview mode of the wearable device;
   storing a list of applications designated for the preview mode;
   identifying, using the stored list, the plurality of applications on the wearable device that are in the preview mode, wherein the preview mode comprises displaying most recently updated views of screenshots for the plurality of applications in the preview mode, wherein the most recently updated view of a screenshot that is displayed on a display is updated at a time subsequent to a time that a user last accessed one of the plurality of applications;
   loading the plurality of applications that are in the preview mode into a memory of the wearable device;
   receiving, at a user interface of the wearable device, an indication to provide the preview mode on a display of the wearable device; and
   providing the screenshots of the plurality of applications in the preview mode such that the screenshots are accessible for viewing by the user, the screenshots of the plurality of applications in the preview mode being accessible by moving the screenshots onto and off the display via a touch interface of the display.

13. The computer readable medium according to claim 12, wherein the instructions for loading the plurality of applications that are in the preview mode into the memory of the wearable device comprise:
   identifying a predetermined file size for the one or more applications to be loaded into the memory of the wearable device; and
   loading the one or more applications, within the predetermined file size, into the memory of the wearable device.

14. The computer readable medium according to claim 12, wherein the instructions for loading the plurality of applications that are in the preview mode into the memory of the wearable device comprise:
   determining one or more applications that are open on the wearable device; and
   loading the one or more applications that are open on the wearable device in the preview mode.

15. The computer readable medium according to claim 12, wherein the instructions for loading the plurality of applications that are in the preview mode into the memory of the wearable device comprise:
   determining one or more applications that are most recently used by the user; and
   loading the one or more applications that are most recently used by the user in the preview mode.

16. The computer readable medium according to claim 12, wherein the designation of the plurality of applications to be included in the preview mode of the wearable device is received from the user.

17. A wearable device comprising:
   a memory; and
   one or more processors configured to:
      receive a designation of a plurality of applications to be included in a preview mode of the wearable device;
      store a list of applications designated for the preview mode;
      identify, using the stored list, the plurality of applications on the wearable device that are in the preview mode, wherein the preview mode comprises displaying most recently updated views of screenshots for the plurality of applications in the preview mode, wherein the most recently updated view of a screenshot that is displayed on a display is updated at a time subsequent to a time that a user last accessed one of the plurality of applications;
      load the plurality of applications that are in the preview mode into a memory of the wearable device;
      receive, at a user interface of the wearable device, an indication to provide the preview mode on a display of the wearable device; and
      provide the screenshots of the plurality of applications in the preview mode such that the screenshots are accessible for viewing by the user, the screenshots of the plurality of applications in the preview mode being accessible by moving the screenshots onto and off the display via a touch interface of the display.

18. The device according to claim 17, wherein the loading the plurality of applications that are in the preview mode into the memory of the wearable device comprises:
   identifying a predetermined file size for the one or more applications to be loaded into the memory of the wearable device; and
   loading the one or more applications, within the predetermined file size, into the memory of the wearable device.

19. The device according to claim 17, wherein the loading the plurality of applications that are in the preview mode into the memory of the wearable device comprises:
   determining one or more applications that are open on the wearable device; and
   loading the one or more applications that are open on the wearable device in the preview mode.

20. The device according to claim 17, wherein the loading the plurality of applications that are in the preview mode into the memory of the wearable device comprises:
   determining one or more applications that are most recently used by the user; and loading the one or more applications that are most recently used by the user in the preview mode.

21. The device according to claim 17, wherein the designation of the plurality of applications to be included in the preview mode of the wearable device is received from the user.

\* \* \* \* \*